United States Patent [19]
Burton

[11] Patent Number: 5,868,182
[45] Date of Patent: Feb. 9, 1999

[54] SUBMERSIBLE LOGGING DEVICE

[76] Inventor: Cyril Burton, S12, C20, R.R. #1, Castlegar, Bristish Columbia, Canada, V1N 3H7

[21] Appl. No.: 834,501

[22] Filed: Apr. 4, 1997

Related U.S. Application Data

[60] Provisional application No. 60/014,768 Apr. 4, 1996.
[51] Int. Cl.[6] .............................. A01G 23/08; B27B 5/02
[52] U.S. Cl. ............................. 144/34.1; 83/483; 83/928; 30/379; 405/205; 405/191; 144/335
[58] Field of Search .................................. 30/166.3, 380, 30/379, 379.5; 83/651.1, 651, 830, 928, 483; 405/200, 205, 225, 227; 144/34.1, 335, 336, 191

[56] References Cited

U.S. PATENT DOCUMENTS

| | | | |
|---|---|---|---|
| 3,667,515 | 6/1972 | Corey | 83/743 |
| 3,693,676 | 9/1972 | Burch | 30/381 |
| 3,719,116 | 3/1973 | Burton et al. | 83/483 |
| 4,168,729 | 9/1979 | Tausig et al. | 144/34.5 X |
| 4,746,246 | 5/1988 | Cowan et al. | 405/191 |
| 4,802,517 | 2/1989 | Laster | 144/34.5 |
| 5,042,959 | 8/1991 | Tadatsu | 405/191 |
| 5,107,594 | 4/1992 | Ferreras | 30/372 |

OTHER PUBLICATIONS

Treasures of the Deep, Logging & Sawmilling Journal, May, 1996, Reg Barclay, pp. 16–18.

*Primary Examiner*—W. Donald Bray
*Attorney, Agent, or Firm*—Antony C. Edwards

[57] ABSTRACT

The underwater logging device of the present invention is selectively remotely maneuverable to engage submerged free standing timber with sawing and dogging apparatus for selectively sawing and dogging the timber. The device includes a buoyancy tank mounted on a frame; a selectively remotely actuable steering mechanism mounted to the frame; independently steerable motivating traction wheels or the like, rotatably mounted to the frame and cooperating with, so as to be steerable by, the steering mechanism for translating the underwater logging device over a lakebed and between the free standing timber; a remotely monitorable vision system is mounted to the frame; selectively remotely actuable saws are mounted to the frame so as to be disposable outwardly of the fine for cutting engagement with the free standing timber once the underwater logging device has been translated into proximity with the free standing timber by the motivating traction wheels.

16 Claims, 27 Drawing Sheets

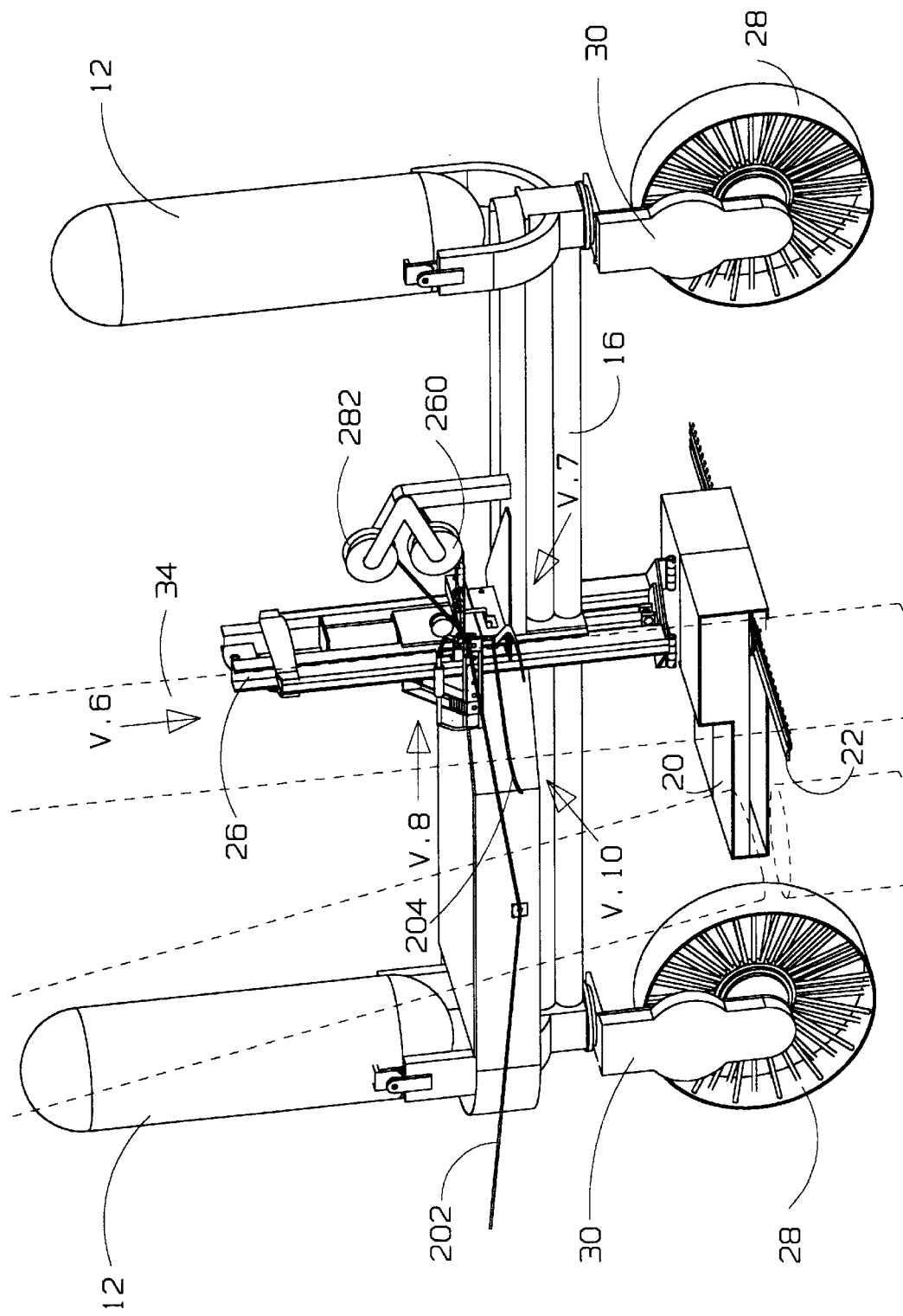

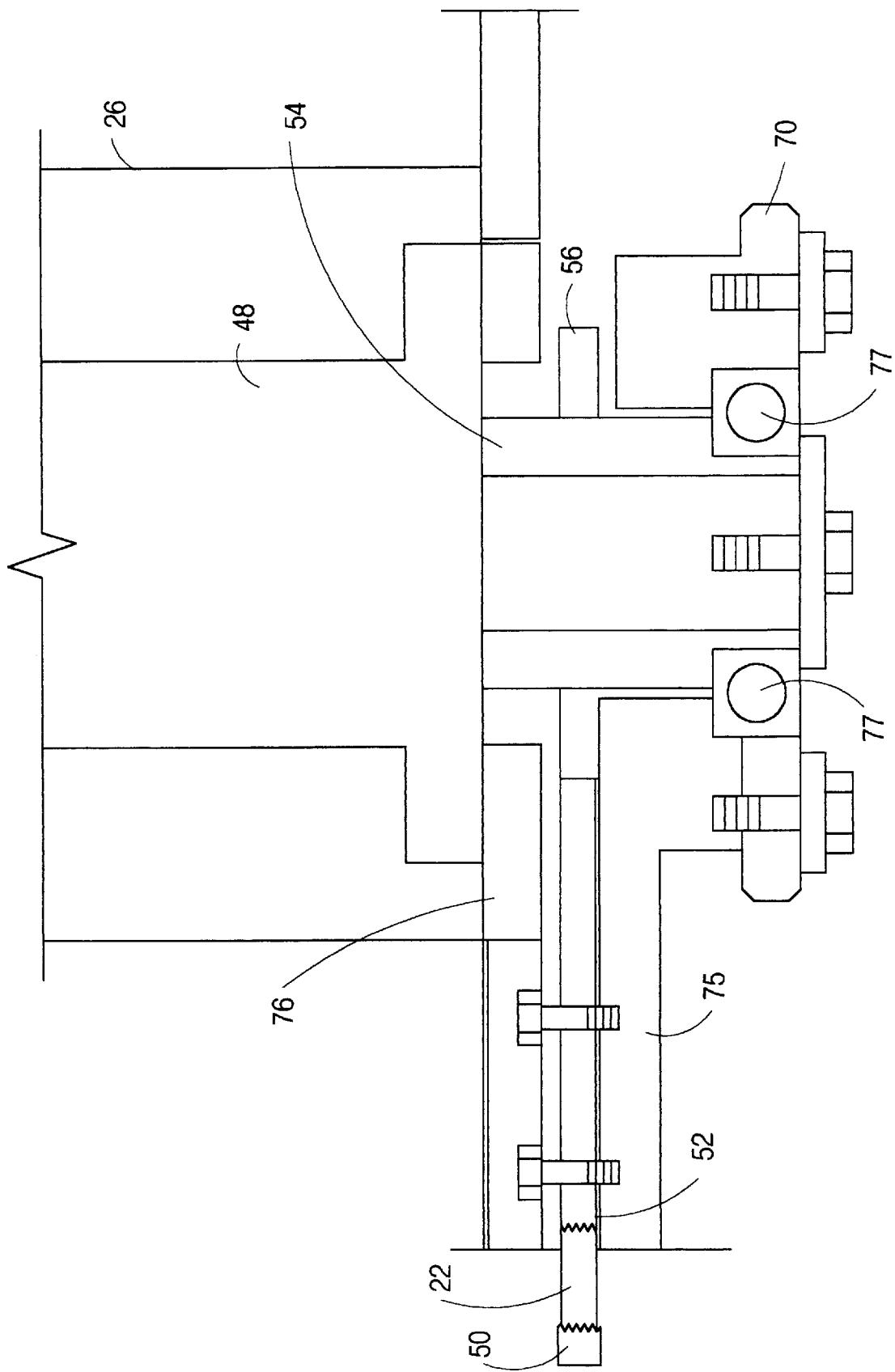

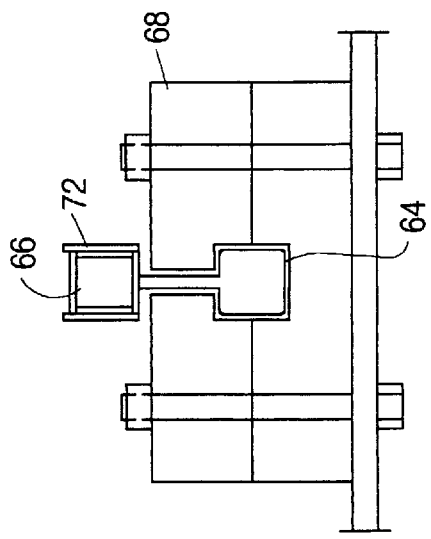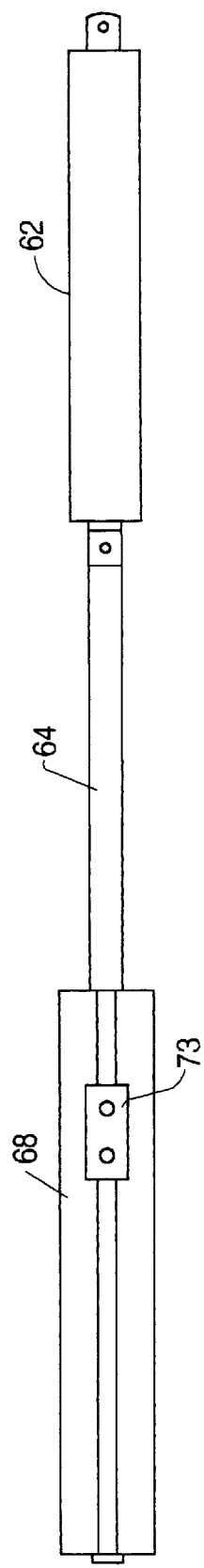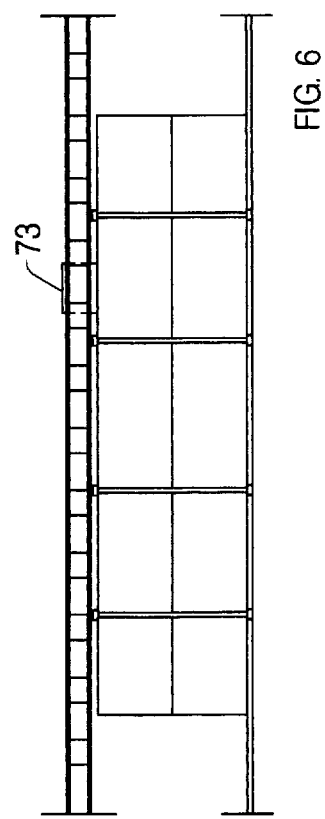

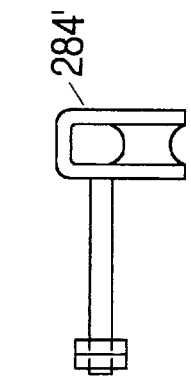
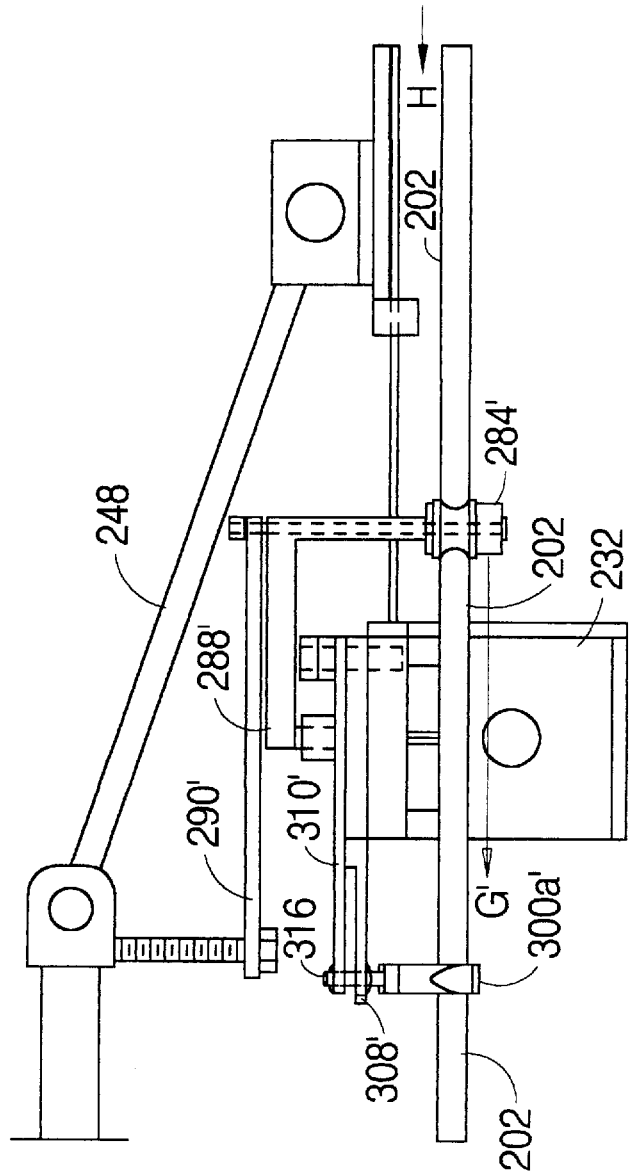
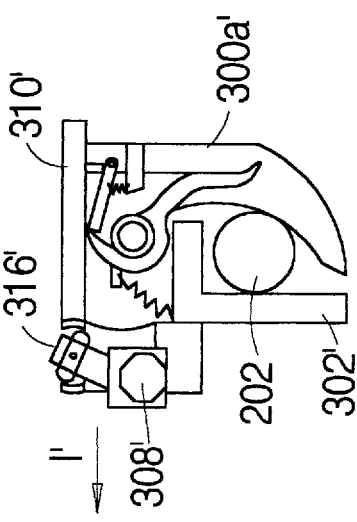

SUBMERSIBLE LOGGING DEVICE

FIELD OF THE INVENTION

This invention relates to a submersible logging device for harvesting timber which is submerged, and in particular timber from the bottom of dam sites.

BACKGROUND OF THE INVENTION

When a valley is dammed, typically the timber is left standing as the valley fills with water leaving harvestable timber submerged. Applicant is aware of only one attempt in the prior art to harvest submerged timber, that being a hydraulically actuated pincer type cutter lowered from a crane. This prior art device is severely limited in the depth to which the cutter can be lowered in that the device once lowered has no remote maneuvering means and no remote vision systems so that the device must be maneuvered from the surface.

Applicant is aware of U.S. Pat. No. 3,667,515 which issued Jun. 6, 1972 to Corey for a Pile Cutting Device. Corey teaches a pile cutting device for use in locations remote from the operator. A pile cutter suspended on a cable is lowered by means of a crane to a desired depth, for example, to the bottom of a water body. The base of the pile cutting device is lowered so as to journal the pile in the base as base is lowered. The base has a guide across which is swept a selectively actuable blade. The blade shears the pile at its base.

Applicant is also aware of U.S. Pat. No. 3,693,676 which issued on Sep. 26, 1972 to Butch for an Underwater Pile Cutting Saw. Burch discloses a power saw capable of being manually manipulated above the surface of a body of water for cutting off pilings and the like adjacent to the bottom. A locater member engages around the piling or object to the cut and includes a post about which a saw swings, so as to swing across the locater member to cut off the piling or object. The locater member and saw may be manipulated from a boat, barge, dock or the like, it being an object of the Burch device to eliminate pilings and other objects adjacent the bottom as navigational hazards.

Applicant is further aware of U.S. Pat. No. 4,168,729 which issued Sep. 25, 1979 to Tausig et at for an Underwater Self-gripping Pile Cutting Device. As in the Corey device, Tausig et al teach a shearing pile cutter lowerable by means of a cable onto a pile. The shear cutter assembly has self-gripping teeth or spikes incorporated as part of the cutting blades to hold the pile and prevent slipping during cutting operations. As the hydraulically operated scissor-type cutter blades close about the pile, the spikes bite into the timber and keep the blades from squeezing off the pile.

None of the above devices are adapted for remotely controllable submersed logging. Consequently, it is an object of the present invention to provide a submersible device for cutting submersed timber, the device being maneuverable on a dam site floor and having remote vision means whereby the submersible device may be remotely and accurately maneuvered so as to engage a log cutting means against the submersed timber.

SUMMARY OF THE INVENTION

The underwater logging device of the present invention is selectively remotely maneuverable to engage submerged free standing timber with sawing and dogging apparatus for selectively sawing and dogging the timber. The device includes a buoyancy tanks mounted on a flame; a selectively remotely actuable steering mechanism mounted to the frame; independently steerable motivating traction wheels or the like, rotatably mounted to the frame and cooperating with, so as to be steerable by, the steering mechanism for translating the underwater logging device over a lakebed and between the free standing timber; a remotely monitorable vision system is mounted to the frame; selectively remotely actuable saws are mounted to the frame so as to be disposable outwardly of the frame for cutting engagement with the free standing timber once the underwater logging device has been translated into proximity with the flee standing timber by the motivating traction wheels.

Advantageously the frame is elongate and the buoyancy tanks are at least one tank or a pair of buoyancy tanks mounted on opposite ends of the frame, or other buoyancy means. The steering mechanism may be a pair of selectively actuable, coordinated fore and aft actuators mounted on said frame or other steering means.

The motivating traction wheels may be fore and aft hydraulically motivated wheels or other traction means corresponding to, and selectively steerable by, the steering mechanism. The vision system may be a sonar sensing and monitoring means, or a video surveillance and monitoring means.

The saw may be chainsaws pivotally mounted on a selectively elevatable platform, mounted to, and elevatable relative to, said frame or other sawing means. The elevatable platform may be selectively tiltable relative to the frame. The chainsaws may be pivotally mounted so as to be swung from a recessed position, generally recessed relative to the platform, to an outwardly disposed position generally perpendicular to the frame and lying in a plane generally parallel to the platform. The chainsaws may be selectively actuable by hydraulic actuation.

The underwater logging device may also include a log dogging mechanism or means mounted on the frame. The log dogging mechanism may be mounted to the frame so as to extend laterally outwardly of the frame and may include means for holding the timber member adjacent said dogging mechanism, means for holding a dogging line between a dogging plate and a timber member, held in a retention means on the log dogging mechanism for releasably retaining the dogging plate on the log dogging mechanism. The dogging mechanism includes securing means for securing the dogging plate to the timber member so as to clamp the dogging line therebetween. Releasing means may be provided for releasing the dogging line once secured between the dogging plate and the timber member.

Further advantageously, the means for holding a dogging line includes a pivotable arm having a dogging line guide at a distal end thereof for guiding the dogging line across the dogging plate, and wherein the retention means aligns the dogging plate releasably mounted thereon with the securing means, and the securing means includes driving means for driving a securing member through a corresponding aperture in the dogging plate into secured engagement with the timber member, and wherein the releasing means is actuated by proximity to, and engagement of, the timber member. The securing member may be a bolt, and the driving means may be a selectively actuable first hydraulic ram.

In one aspect of the present invention the means for holding the timber member adjacent the dogging device are selectively actuable pincers for clamping the timber member between the pincers and actuable by a selectively actuable second hydraulic ram. In a further aspect, the first and second hydraulic rams are on a single hydraulic circuit and the first hydraulic ram is actuatable so as to be actuated after a delay following actuation of said second hydraulic ram where the delay is regulated by frictional braking means applied to the first hydraulic ram whereby hydraulic pressure applied to the single hydraulic circuit actuates the pincers to grasp the timber member before the bolt is driven through the aperture in the dogging plate and into the timber member to secure the dogging line to the timber member.

BRIEF DESCRIPTION OF THE DRAWINGS

FIG. 1a is a side elevation view in view direction V.4 in FIG. 1.

FIG. 3 is a view in view direction V.2 in FIG. 1.

FIG. 4b is, in enlarged view, microswitches of FIG. 4a.

FIG. 6 is, in enlarged, partially cut-away side elevation view, the chain driven chainsaw actuator of FIG. 5.

FIG. 7 is, in enlarged, partially cut-away plan view, the chainsaw actuator of FIG. 5.

FIG. 8 is, in cross-sectional view, the chainsaw actuator of FIG. 5.

FIGS. 21 and 21a are the dogging mechanism of FIGS. 19 and 20 seen in view direction V.7 in FIG. 1a.

FIGS. 25, 25a, 25b and 26, where FIG. 25 is a view in view direction V.10 in FIG. 1a, illustrate an alternative embodiment of the rope shuttle and dogging mechanism of the underwater logging device of the present invention.

DETAILED DESCRIPTION OF THE PREFERRED EMBODIMENT

Figure 1:
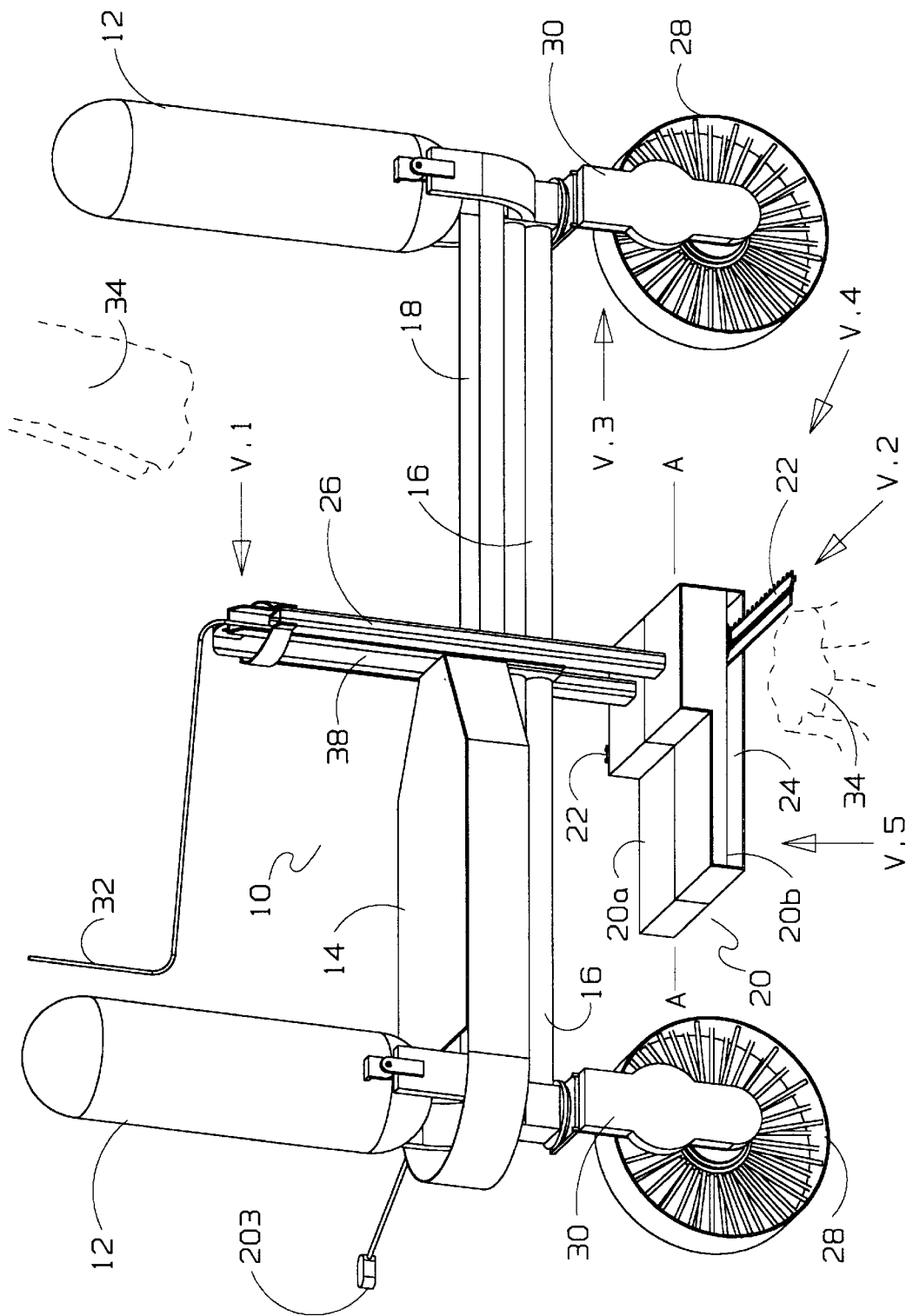
FIG. 1 is, in perspective view, the underwater logging device of the present invention.

Due to the complexity of the various views illustrated in the Figures, detailed view directions are assigned to corresponding Figures. View numbers in the overall views of FIGS. 1 and 1a, for example "V.1" in FIG. 1 indicates View direction 1 which is the subject of FIG. 2. View numbers in FIGS. 1 and 1a are associated with arrows indicating the direction of the particular detailed View.

Thus, with reference to the drawings, the remote controlled submersible logging device or apparatus 10 is depicted generally in FIGS. 1, 1a, 1b and 1c. As depicted in those figures, device 10 includes buoyancy tanks 12, steering mechanism housing 14, mainframe 16, steering cable guard 18, saw platforms 20, saws 22, which may be conventional chain saws, retractable within saw receiving pockets 24, cylinder housing 26 and wheels 28 on wheel supports 30.

In operation, a badge (not shown) on the surface of a dam site lake, in which cutter 10 is submerged, supplies hydraulic power, 12-volt electric current and compressed air through lines 32. Wheels 28 on device 10 are both individually and independently hydraulically powered via hydraulic motors having a primary reduction and planetary drive as hereinafter described. The hydraulic motors are independently controllable from the barge.

Steering of wheels 28 is accomplished by a cable arrangement in which a steering cable is actuated by two hydraulic cylinders through a slide and pulley system, better described below. Thus, if it is desired to translate device 10 across the floor of the dam site lake, wheels 28 are rotated (ie. pivoted on their steering axles) to the desired orientation and device 10 then is translatable in that direction by driving the wheels 28. Thus, device 10 does not have to turn in a conventional sense, but lather the wheels 28 are turned initially and device 10 may be then directly translated as, for example, sideways so as to bring saws 22 into close proximity with submerged tree trunk 34. If it is necessary to turn device 10, the independent actuation of wheels 28 allows for turning device 10, in the manner of pivoting, about a vertical axis so that device 10 may turn within the length of itself Submerged trees 34 may be cut by saws 22. Saws 22 are advantageously powered by hydraulic motors, one saw 22 on either side of device 10, each having independently actuable hydraulic motors.

In the preferred embodiment, saw platforms 20 include independently rotatable and elevatable left and right saw platforms 20a and 20b. Thus, if device 10 is transversely aligned across a side hill (ie. parallel with topographical contour lines of constant elevation), saw platforms 20 may be rotated about a longitudinal generally horizontal axis, for example, axis A in respect of saw platform 20b and a similarly aligned axis of rotation in respect of saw platform 20a so that saws 22, when pivoted out laterally, about vertical axis of rotation, from saw receiving pockets 24, will lie approximately parallel with the slope of the side hill thereby minimizing the probability of saws 22 cutting into the bank. The rotation of saw platforms 20 about their longitudinal axes of rotation and the elevation of saw platforms 20 relative to mainframe 16 are all independently hydraulically controlled and remotely actuable from the barge.

Given the example that device 10 is moving down a side hill in a longitudinal direction (ie. perpendicular to topographical contour lines of constant elevation) and at least one of saws 22 is in cutting engagement with a submerged tree trunk 34, in the event that the surface of the side hill is not uniformly sloping so that, for example, the front (lowest) wheel 28 drops into a depression as device 10 is translating down the side hill, it is required that saw 22 be elevated or depressed, as the case may be, so as to avoid binding saw 22 within the cut being made though submerged tree trunk 34.

Figure 2:
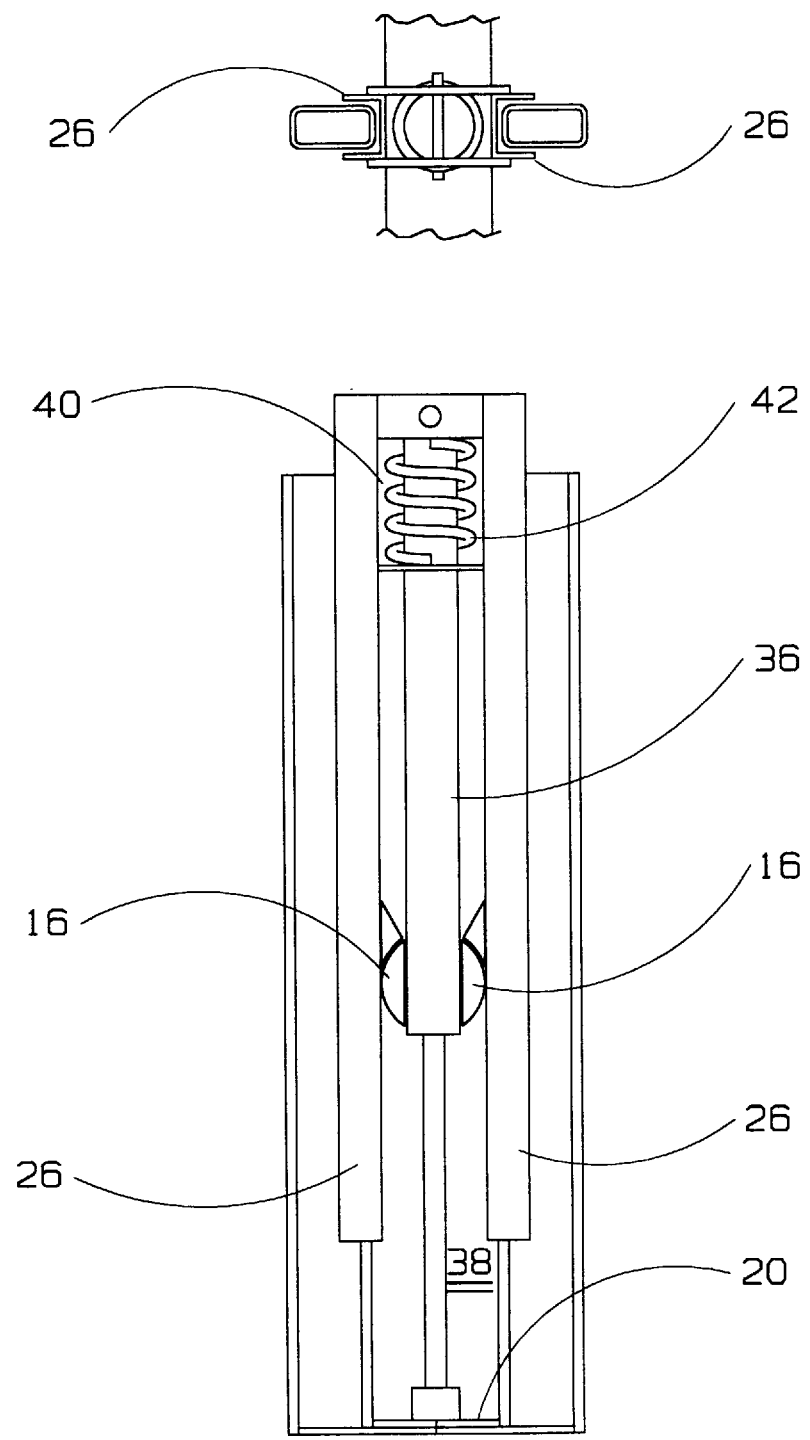
FIG. 2 is a view in view direction V.1 in FIG. 1.

Automatic elevation means are thus provided, such as depicted in FIG. 2, wherein cylinder 36 is mounted vertically within cylinder cavity 38 in cylinder housing 26. Cooperating with cylinder 36, for example, at its uppermost end, is a sensing and automatic elevating means 40 which may be vertically opposed micro switches to sense the upward motion or downward motion respectively of cylinder 36 against the resilient return biasing force of, for example, a helical coil spring 42. As saws 22 start binding, an upward or downward force will cause cylinder 36 to move relative to mainframe 16. Tripping of either of the vertically opposed micro switches would trigger hydraulic actuation of cylinder 36 so as to raise or lower saw platform 20 as the case may be to alleviate jamming of saws 22 within tree trunk 34.

Figure 4A:
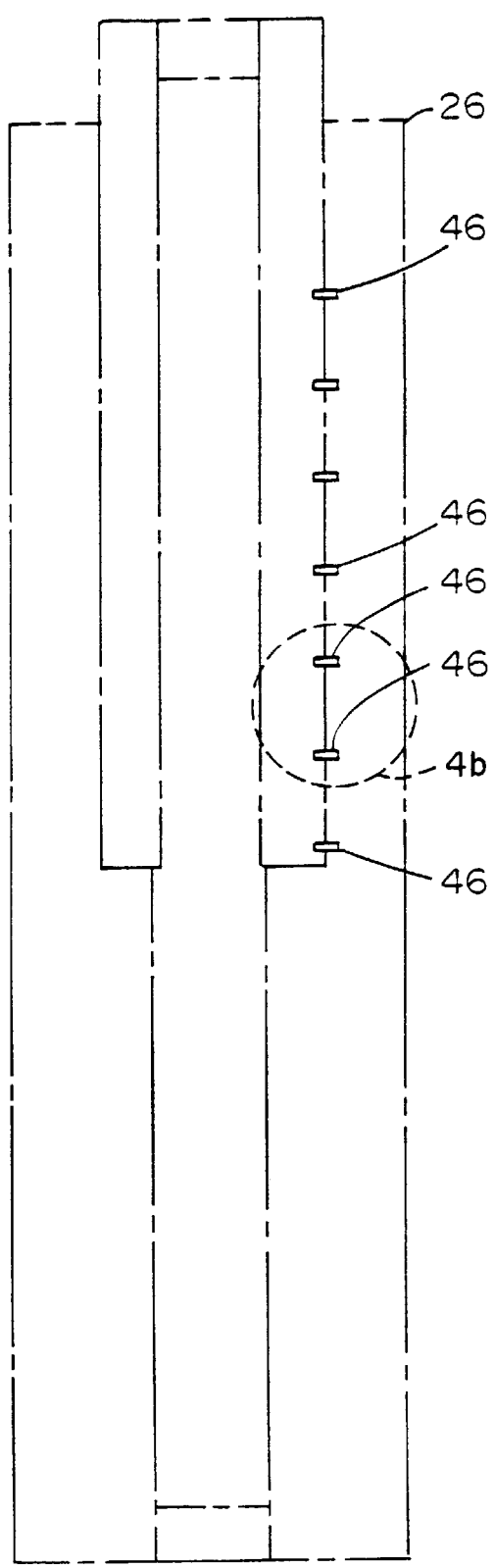
FIG. 4a is, in cut-away view, the arrangement of microswitches within the frame tower in the underwater logging device of the present invention.
Figure 4B:
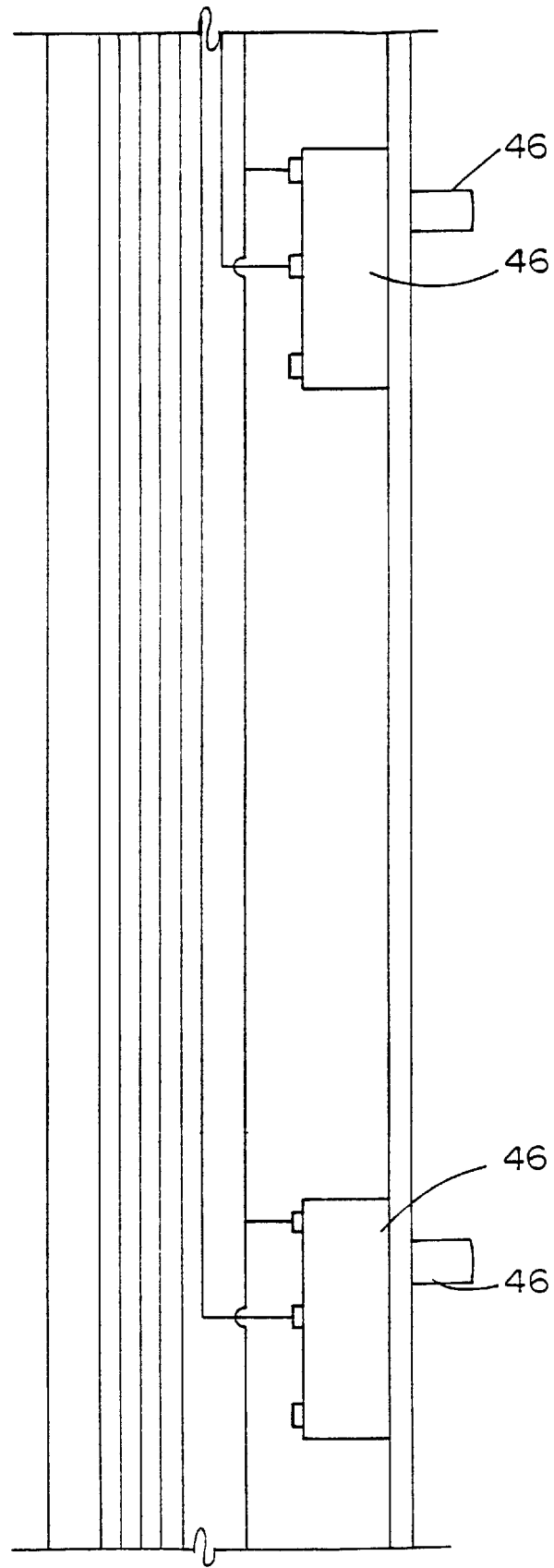

In the preferred embodiment, apart from the micro switches 44 within the automatic elevating means 40, a further vertically aligned spaced apart array of micro switches 46 are disposed within cylinder cavity 38 so as to detect the extent of the extension or retraction of cylinder 36, in other words, to indicate by means of signals sent to indicators on the barge the distance that saw platforms 20 have been extended beneath mainframe 16. The array of micro switches for determining the extension of saw platforms 20 below mainframe 16 is depicted in FIG. 4a, and in an enlarged view in FIG. 4b.

Illustrated in FIG. 3 is an enlarged cut away view of a lower-most portion of cylinder housing 26, cut away to expose hydraulic motor 48. Hydraulic motor 48 is for the hydraulic actuation of cutting chains 50 rotating about bar 52 on saws 22. Chain 50 on bar 52 is wrapped around sprocket 56 at the hydraulic motor hub 54. Sprocket 56 is rigidly mounted to hydraulic motor hub 54. Chain 50 is rotated in the manner of a conventional chain saw cutting blade by rotation of chain 50 around bar 52 by drive sprocket 56 actuated by hydraulic motor 48.

Figure 5:
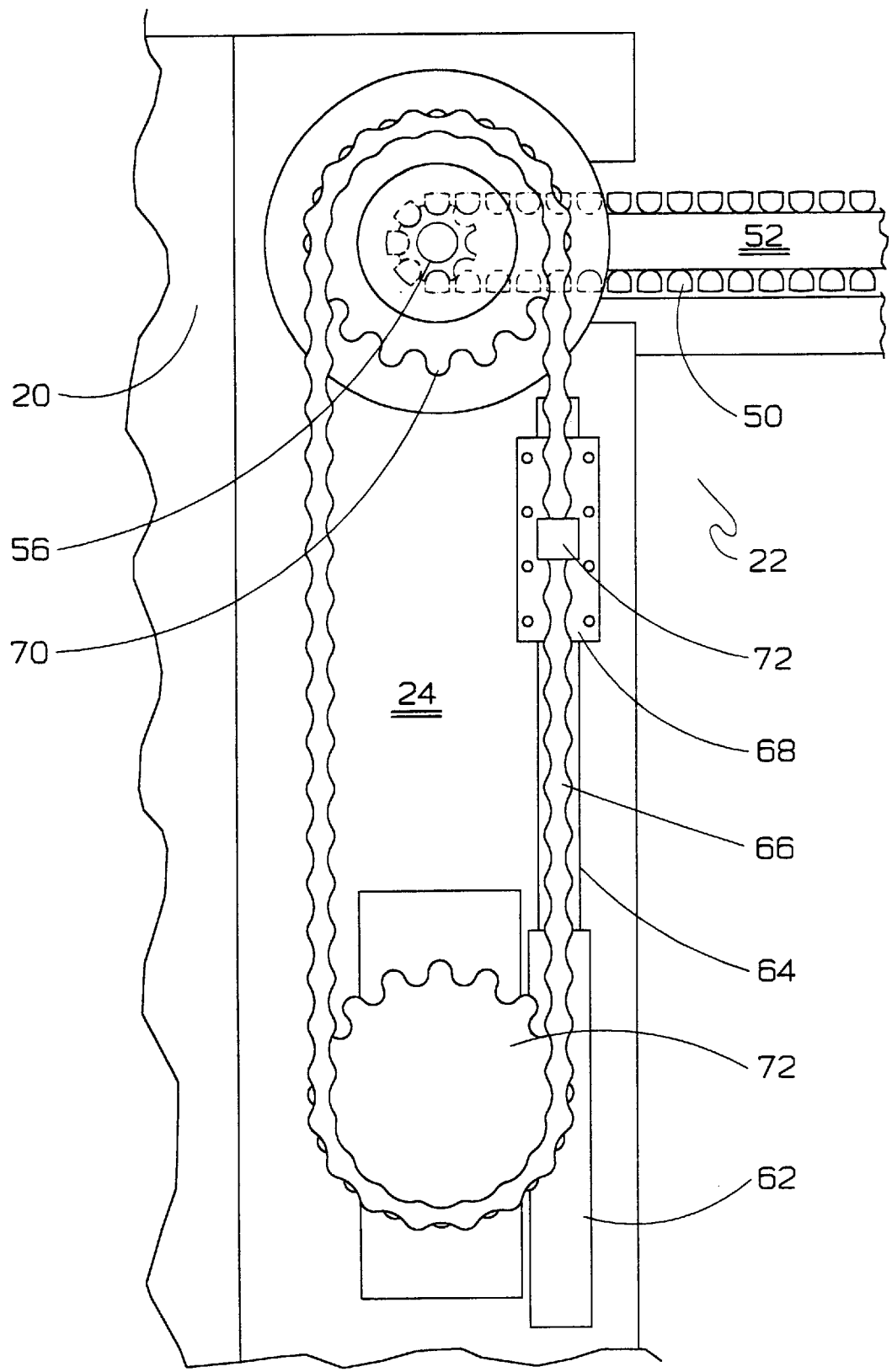
FIG. 5 is, in cut-away plan view, the chain driven chainsaw actuator of the underwater logging device of the present invention.
Figure 5A:
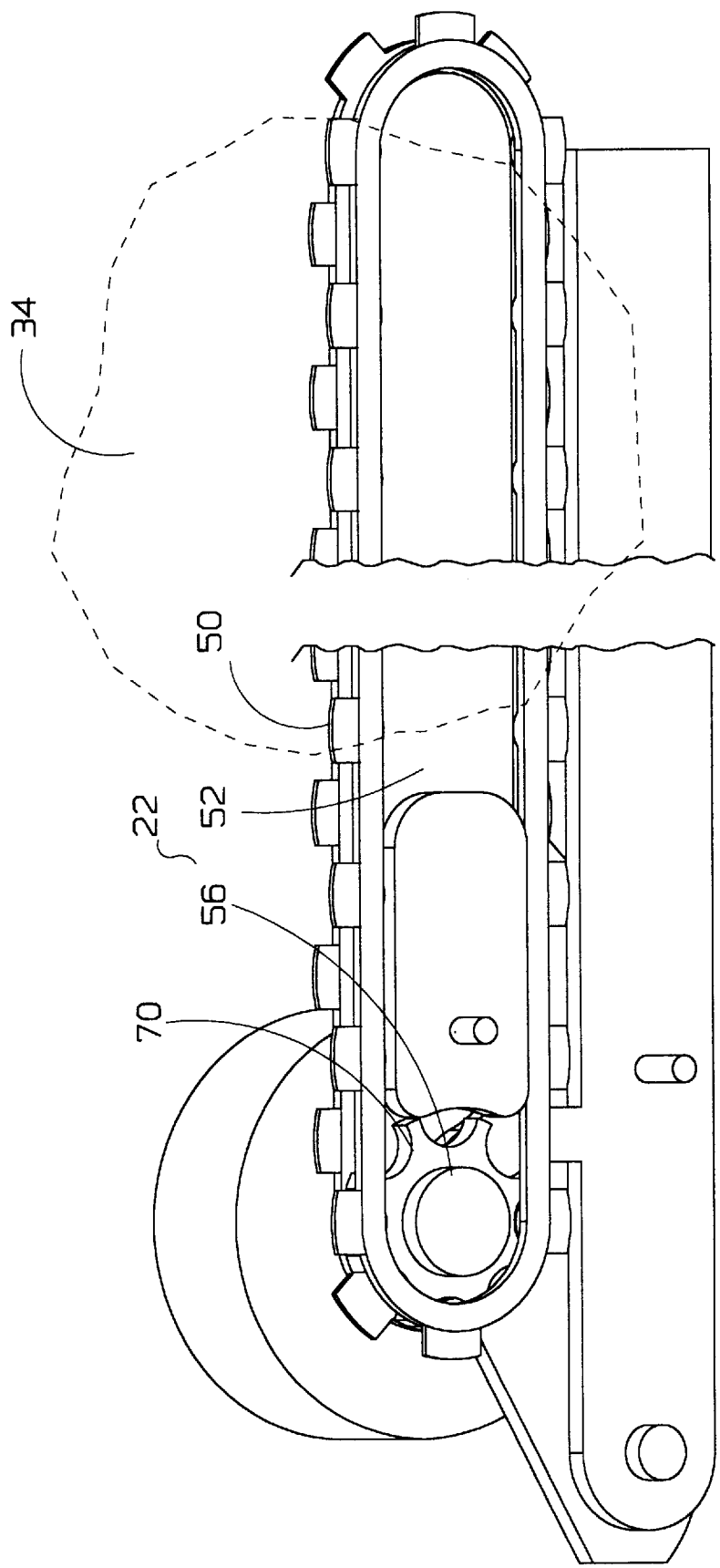
FIG. 5a is, in a bottom view in view direction V.5 in FIG. 1, a chainsaw of the underwater logging device of the present invention in its retracted position.

As illustrated in FIGS. 5 and 5a, saw 22 (shown in dotted outline in its extended position in FIG. 5) is rotated out from saw receiving pocket 24 in saw platform 20 by actuation of cylinder 62 which, by means of pushrod 64 coupled to drive chain 66 which runs along guide block 68 around sprocket 70 (shown in dotted outline), swings saw 22 outward from saw receiving pocket 24 upon actuation of cylinder 62. Swinging of saw 22 from saw receiving pocket 24 triggers a limit switch (not shown) which triggers the operation of hydraulic motor 48 thereby starting the rotation of chain 50 around bar 52 as saw 22 is rotated from within saw receiving pocket 24 to an extended position, for example, 90 degrees outwards from the side of saw platform 20. Bar 52 is rigidly mounted to sprocket 70. In opposed relation to sprocket 70, chain 66 rotates around idler sprocket 72.

FIGS. 5 and 5a illustrate the swing-out mechanism by which saws 22 are extended laterally outwards from cutter 11 so as to engage and cut tree trunks 34.

FIGS. 6–8 illustrate further details of the swing-out mechanism. Specifically, connector 73 links push rod 64 (which extends from cylinder 62) to chain 66 as push rod 64, journaled in guide 68, is actuated to thereby rotate chain 66 around sprockets 70 and 72.

Figure 9:
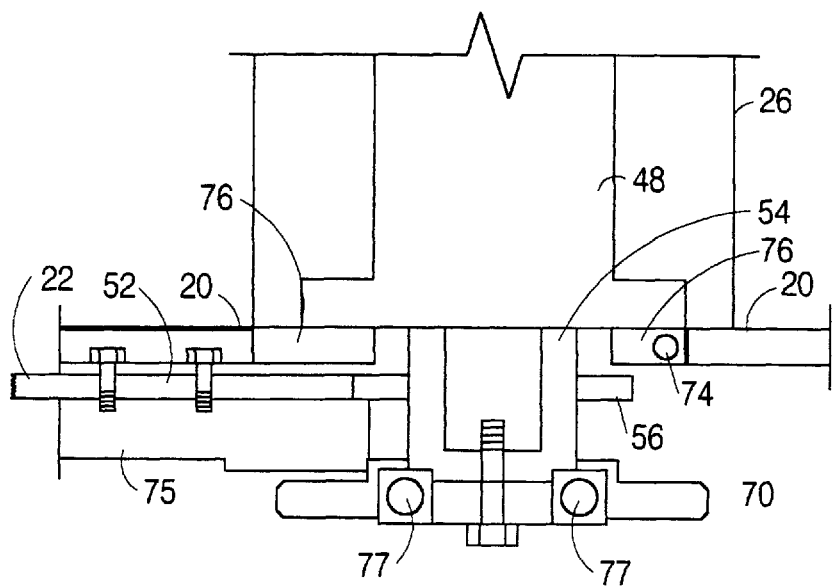
FIG. 9 is, in partially cut-away enlarged cross-sectional view, the chainsaw drive mechanism of the underwater logging device of the present invention.
Figure 9A:
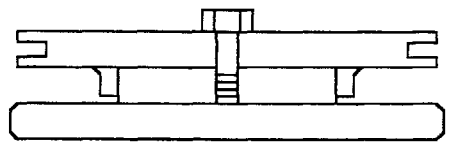
FIG. 9a is, in cross-sectional view, the chainsaw bar of the underwater logging device of the present invention.
Figure 10:
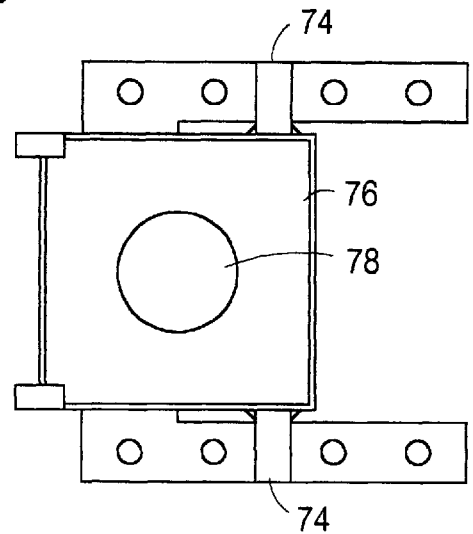
FIG. 10 is, in partially cut-away cross-sectional enlarged view, the tilting mechanism of the chainsaw platform of the underwater logging device of the present invention.
Figure 11:
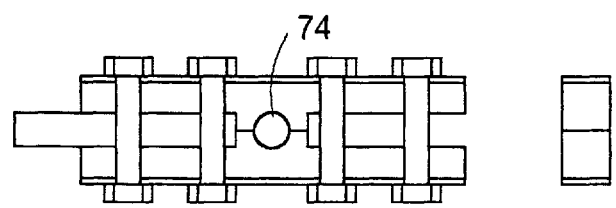
FIG. 11 is, in cross-sectional view, the mounting means of the tilting mechanism of FIG. 10.

FIGS. 9–11 illustrate the embodiment in which saws 22, saw platforms 20a (or 20b as the case may be) may be pivotable about axis A (in the case of saw platform 20b as described above and shown in FIG. 1). In the case of saw platform 20a shown in FIG. 9, it being understood a second pivot and hydraulic power arrangement would also be provided for saw platform 20b, the saw platform pivots about pivot pins 74. Pivot pins 74 extend outwardly in opposed directions from, and are rigidly affixed to, motor mount 76. Bar 50, rigidly mounted to sprocket 70 by bar support 75, is rotatable relative to motor mount 76 and sprocket 56 (which is driven by motor 48 and drive shaft 49) by means of bearings 77.

Figure 12:
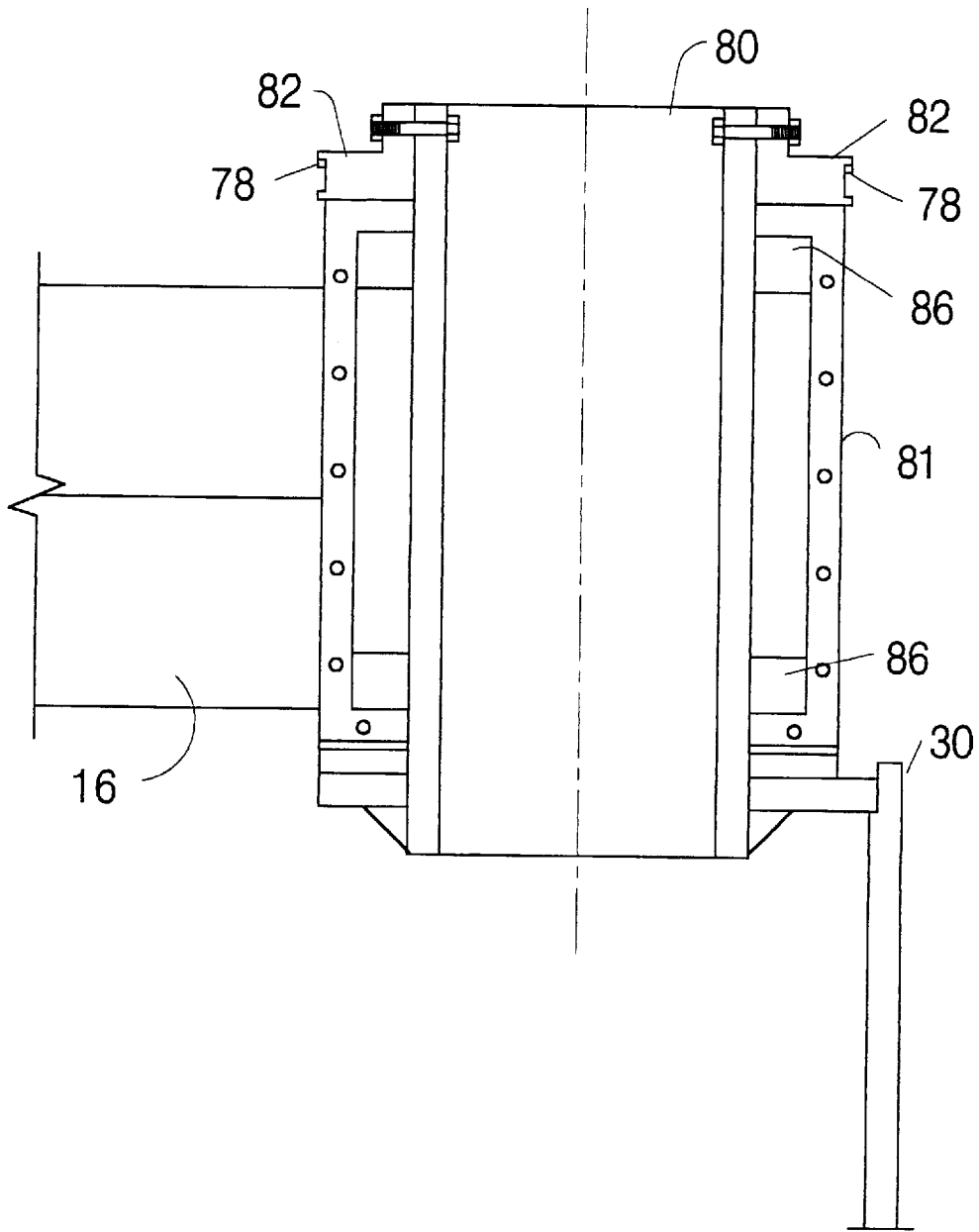
FIG. 12 is, in partially cutaway cross-sectional view, one steering column of the underwater logging device of the present invention.

As illustrated in FIG. 12, wheel supports 30 are rotated about vertical axes centered in and along steering columns 80 located fore and aft on mainframe 16 in steering housings 81. Sprockets 82 are rigidly mounted to steering columns 80. Steering chains 78 are wrapped onto sprockets 82. Steering columns 80 rotate within, and are journaled, in bearings or frictionless collars 86. Thus, rotating steering chains 79 around sprockets 82 rotates steering columns 80.

Figure 1B:
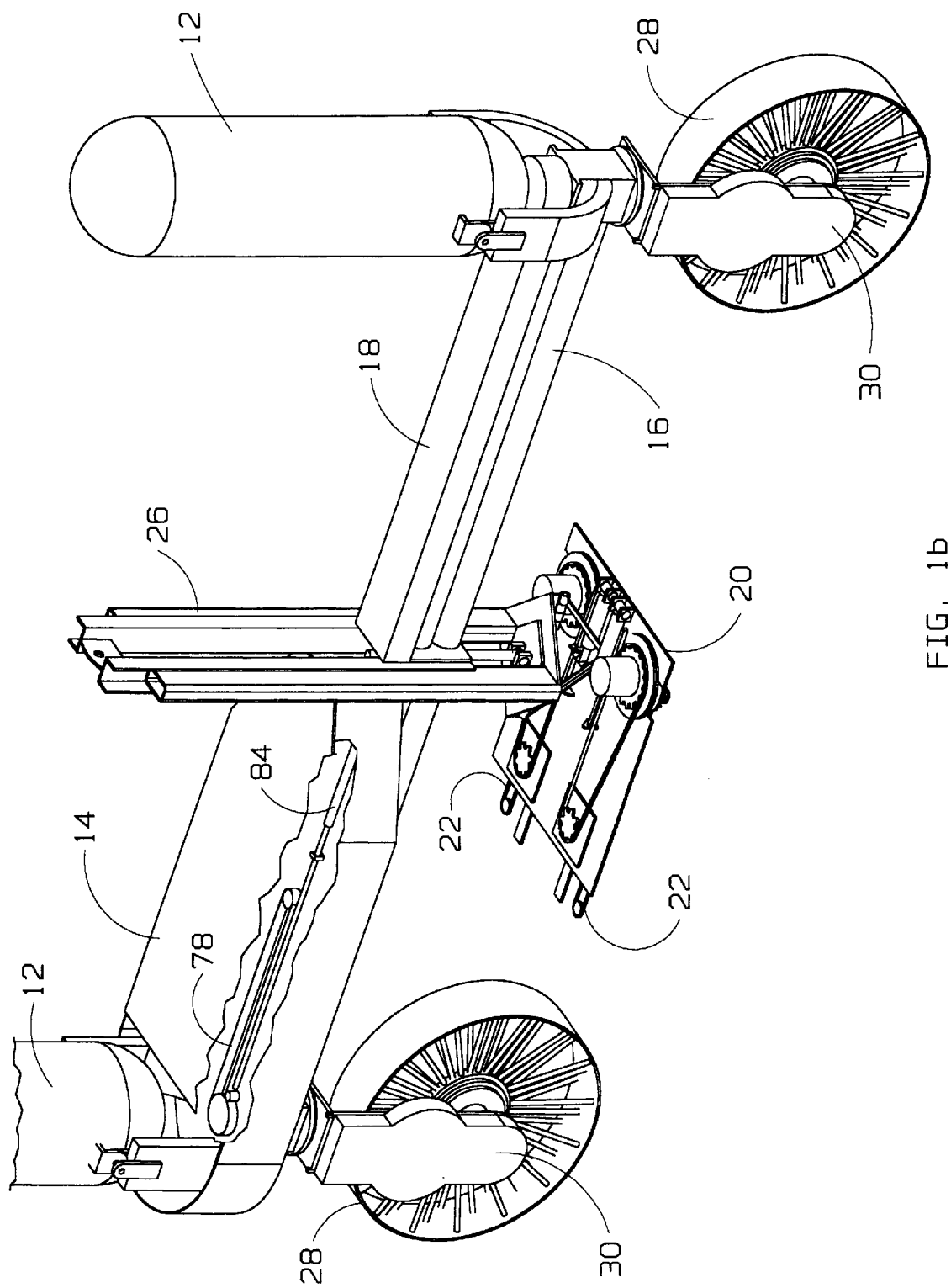
FIG. 1b is, in perspective partially cut-away view, the underwater logging device of FIG. 1.
Figure 1C:
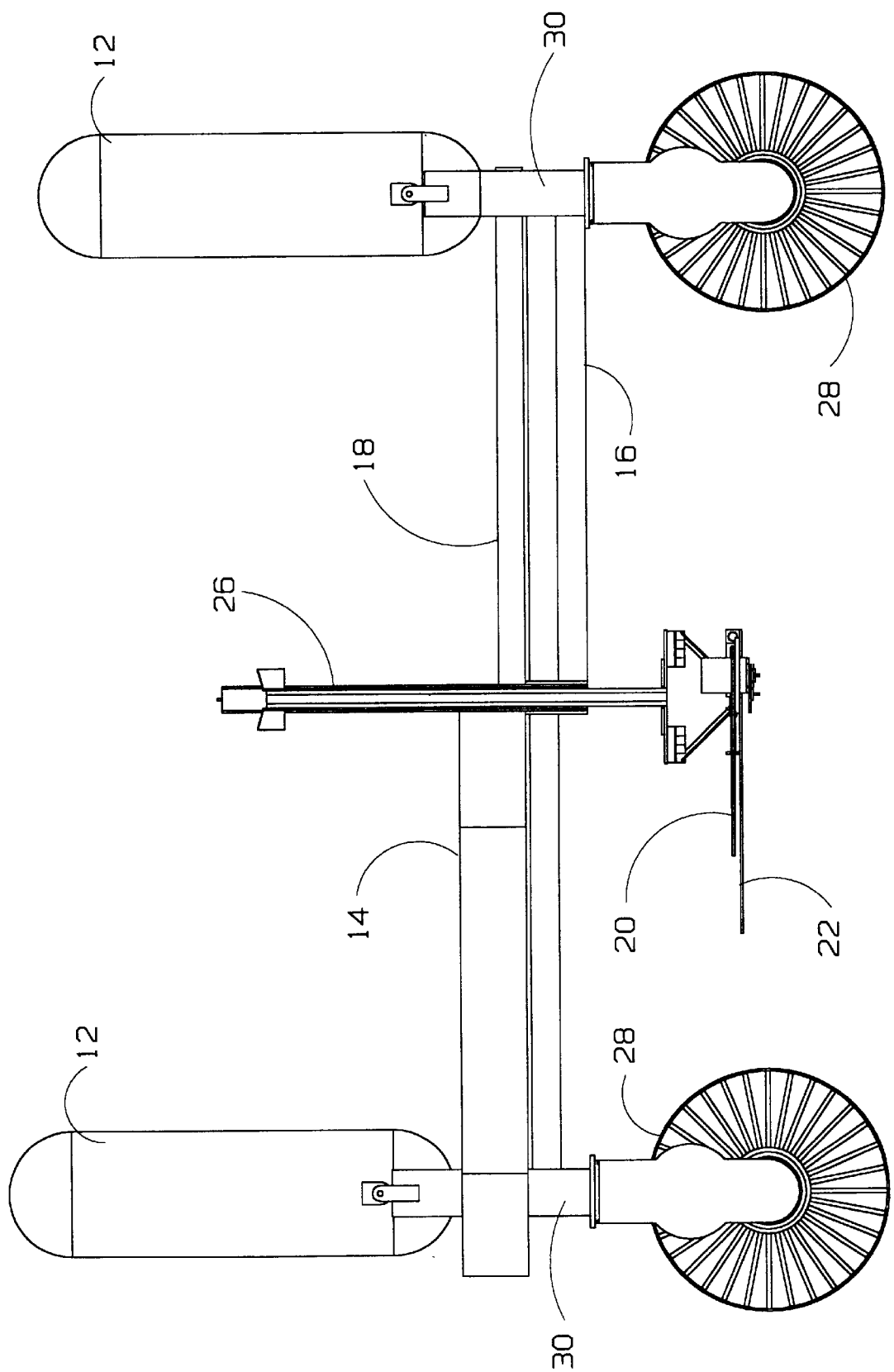
FIG. 1c is, in side elevation view, the underwater logging device of FIG. 1b.

As seen in FIG. 1b, actuates 84 are mounted, at the end of their rams, to steering chains 78, one per steering chain 78. Actuators 84 are independently selectively actuable to independently rotate steering columns 80. Coordinated actuation of actuators 84 may thus be employed to steer wheels 28 to either translate the apparatus 10 longitudinally fore or aft, or laterally, or to rotate apparatus 10 about a vertical axis of rotation.

Figure 13:
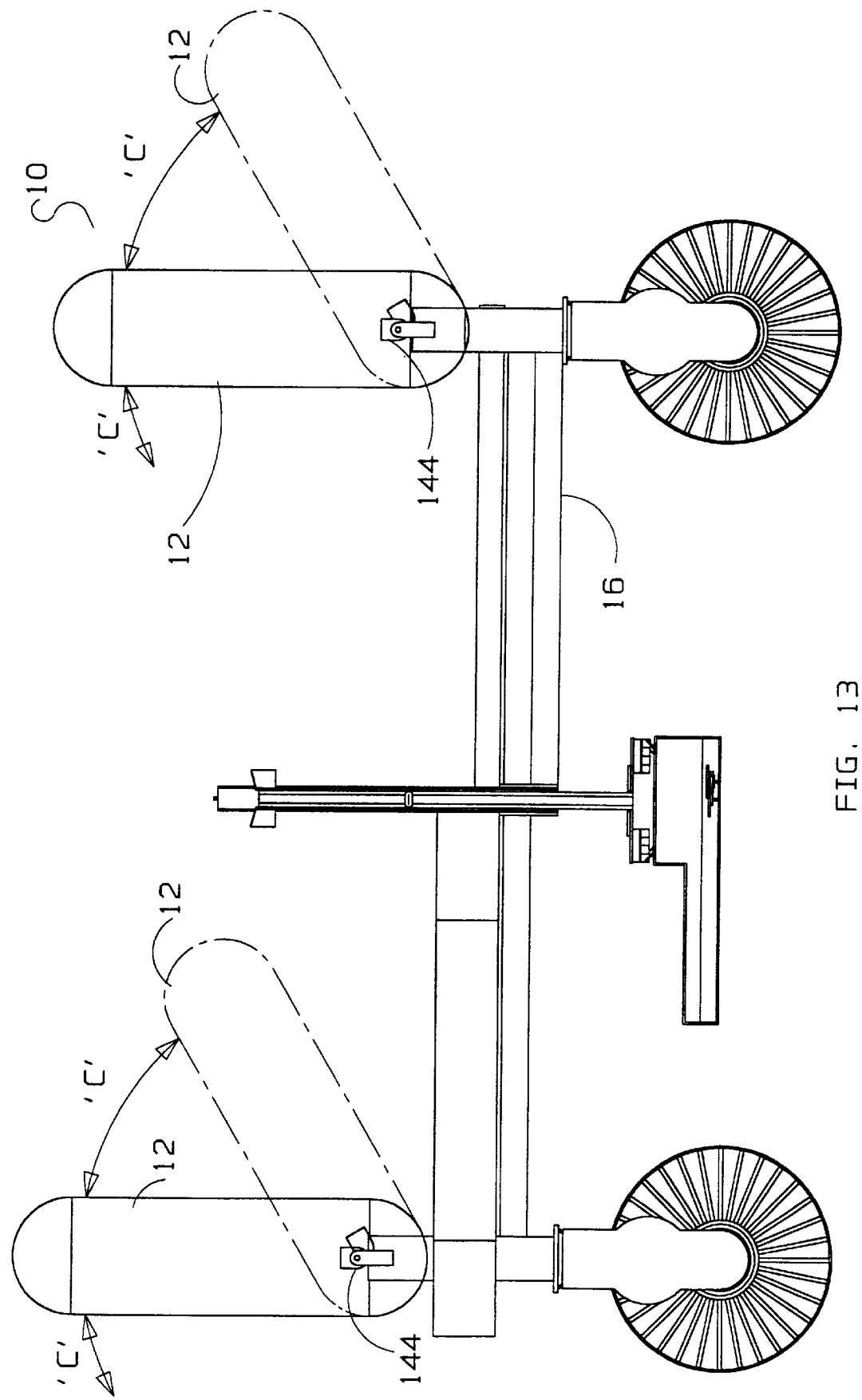
FIG. 13 is, in side elevation view, an alternative embodiment of the underwater logging device of FIG. 1 having rotatable ballast tanks.

In an alternative embodiment illustrated in FIG. 13, buoyancy tanks 12 may be selectively rotated out of a vertical orientation while remaining generally in the same plane. Buoyancy tanks 12 may be rotated about pivotable supports 144 in direction C about an arc on either side of the vertical. Rotating buoyancy tanks 12 allows for cutter 10 to climb slopes without the natural tendency of the buoyancy tanks, if they were held in a vertical orientation relative to mainframe 16, to lift the rear-most, that is, the lower most end of cutter 10 upwards. This would cause, of course, cutter 10 to lose traction and steering control.

Figure 14:
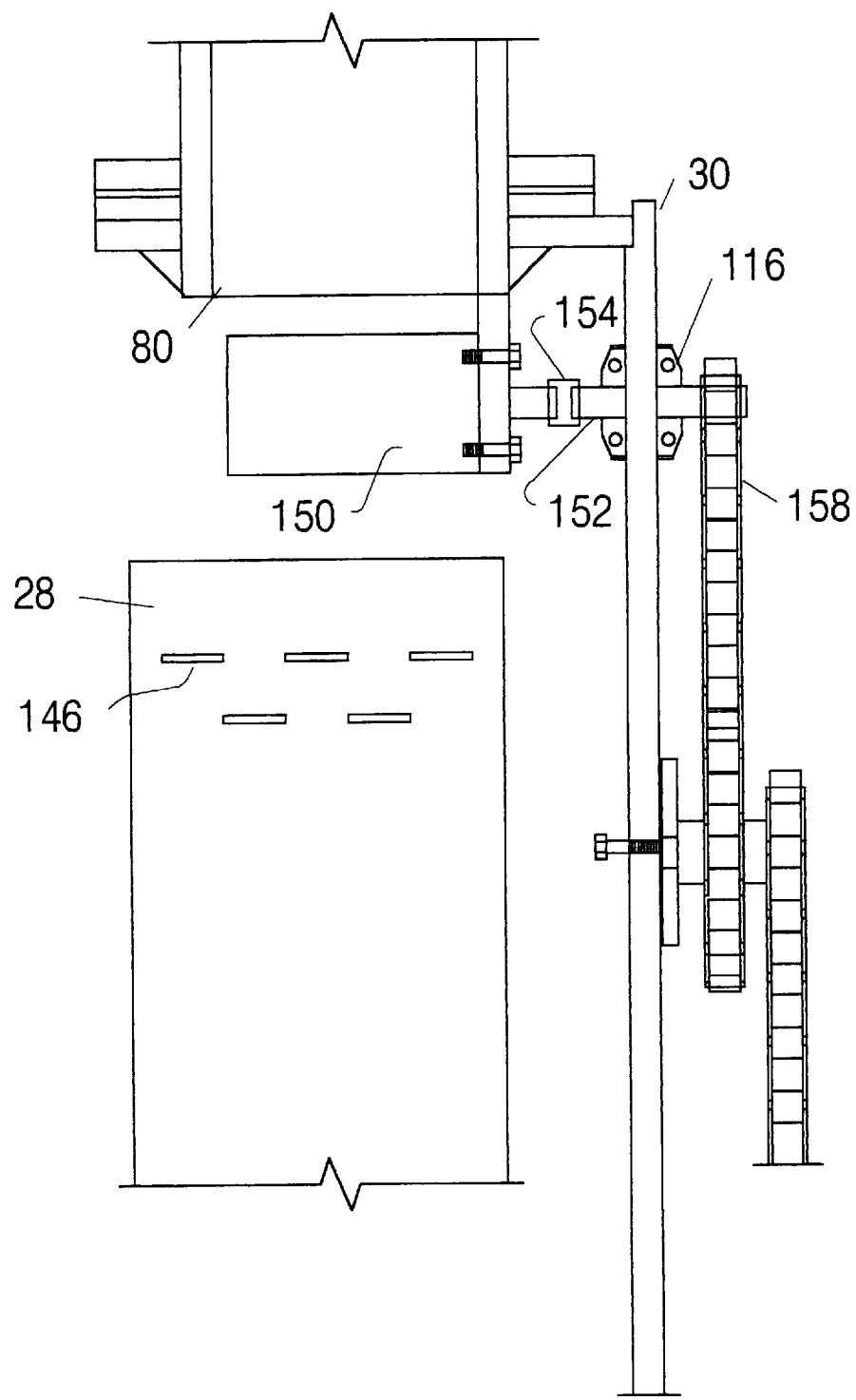
FIG. 14 is, in partially cut-away cross-sectional view, a traction wheel mounted to the steering column of FIG. 12.
Figure 15A:
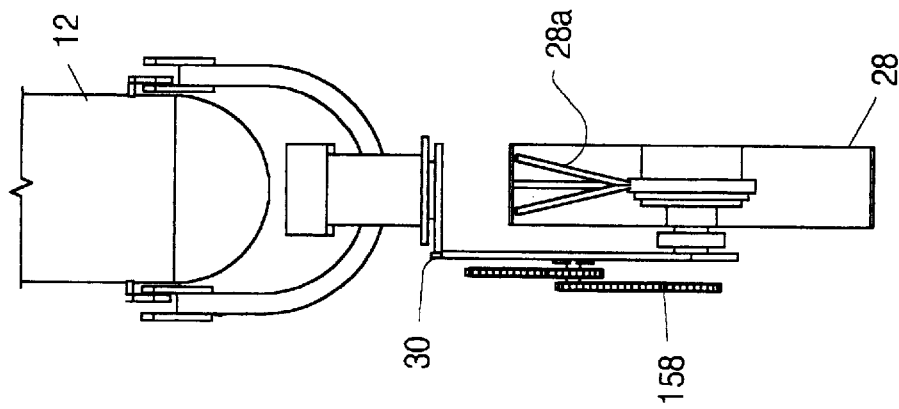
FIG. 15a is, in front elevation view, the traction wheel and steering column of FIG. 15.
Figure 15:
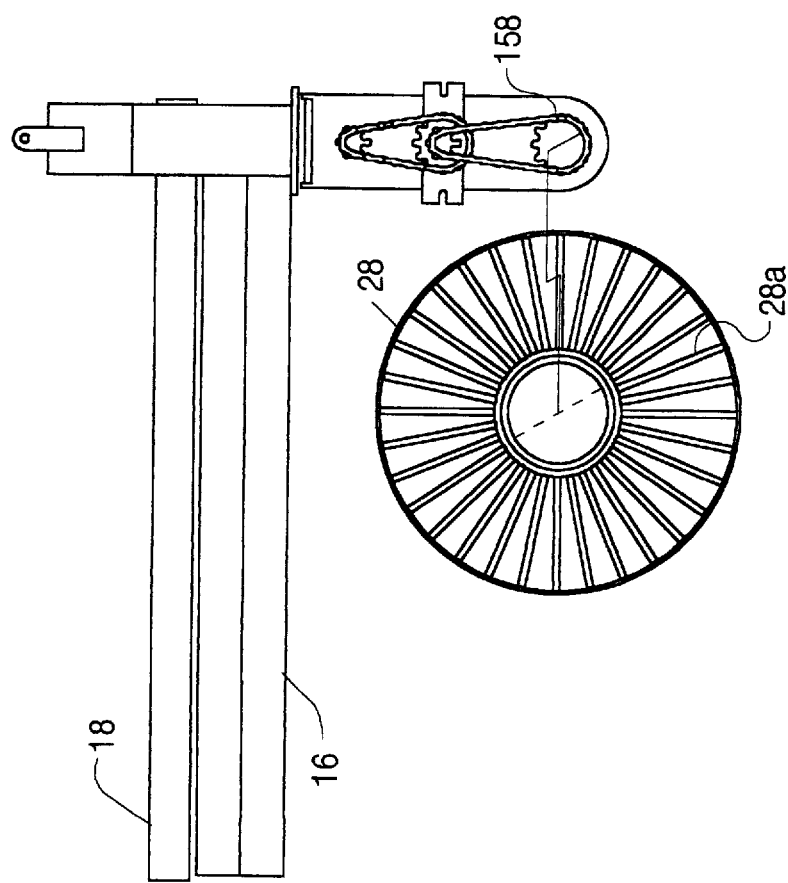
FIG. 15 is, in partially exploded partially cut-away side elevation view, the traction wheel of FIG. 14.
Figure 16:
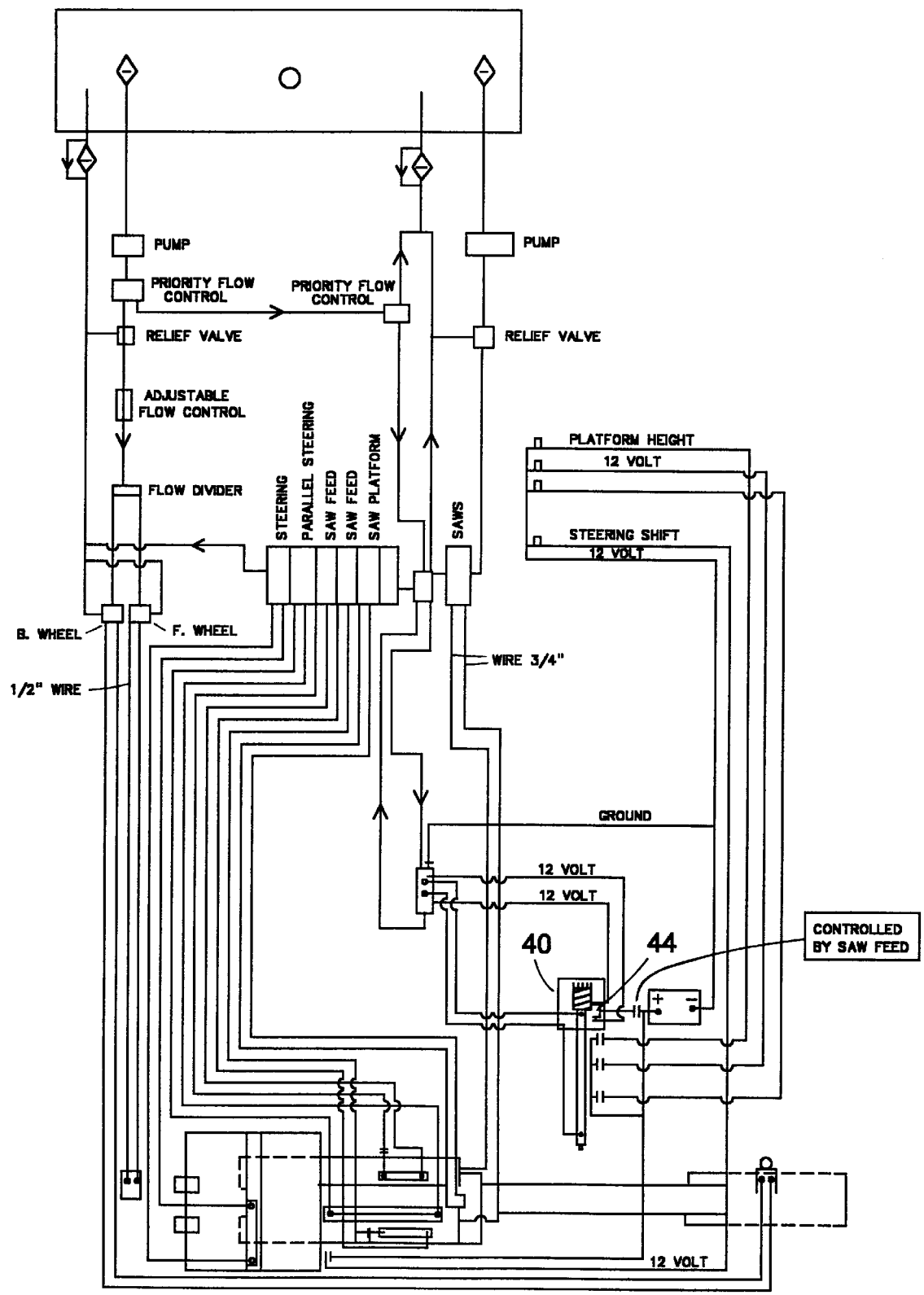
FIG. 16 is a schematic diagram of the electrical circuitry of the underwater logging device of the present invention.

In the preferred embodiment, wheels 28 are steel drum or spoked (spokes 28a) wheels such as seen in FIGS. 15 and 15a, rather than rubber wheels such as illustrated in FIG. 14. By way of analogy, the steel drum wheel would be similar to the old style steel tractor wheels. Thus, wheels 28 would, for example, have lugs 146 extending outwardly from the wheels surface. Wheels 26 are driven by well-now planetary drive 148 or chain and sprocket drive 158. Wheels 28 are supported beneath steering columns 80 by means of wheel supports 30.

Rigidly mounted to and depending below wheel support 30 may be motor unit 150 driving drive axle 152 via star coupling 154. Drive shaft 152 is journalled within bearings 156 and a chain drive 158. The chain drive is connected to the planetary drive 148 as shown in FIG. 15.

Tree Dogging Device

In an alternative embodiment, or in addition to the preferred embodiments described above, for use in particular where trees 34 do not float, the tree dogging device 200 of the submersible logging device of the present invention is adapted, as better described below, to grasp a tree 34 and to fasten a dog line 202 to the outer surface thereof to allow for retrieval to the surface of felled trees.

Figure 17:
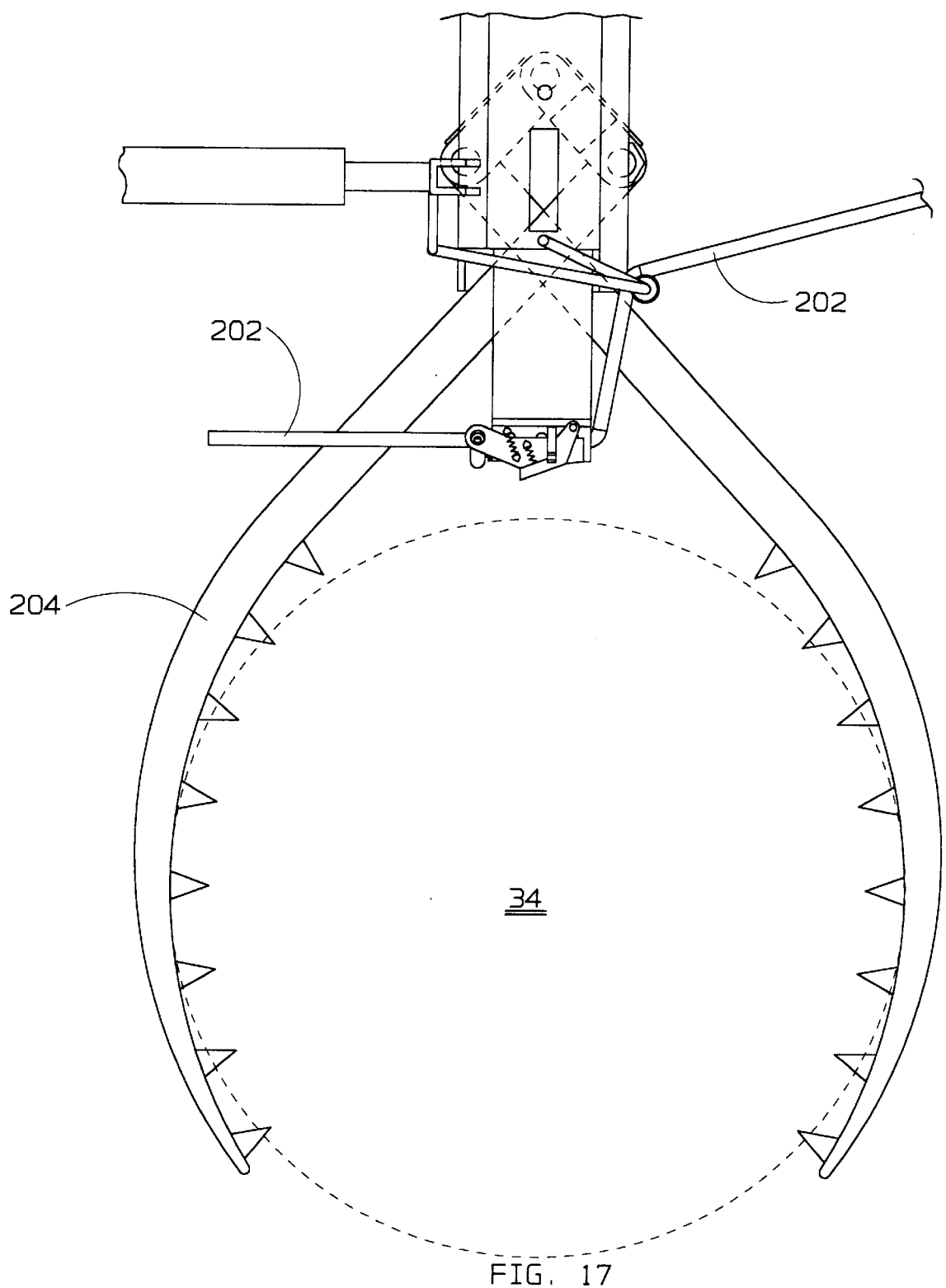
FIG. 17 is, in partially cut-away cross-sectional plan view in view direction V.6 in FIG. 1a, the timber pincers and dogging line dogging device of the present invention.

In operation, logging device 10 is positioned based on information conveyed to an operator from sonar and visual video monitoring means such as camera 203, which may be remotely positionable. Logging device 10 may thus be translated to place dogging device 200 adjacent the trunk of a submerged tree 34, Tree dogging device 200 has selectively actuable means for selectively actuating gripping tongs 204 seen in FIGS. 17 and 18 so as to grip therein tree trunk 34. Preferably, and as better described below, gripping tongs 204 are self centering by means of helical compression springs 206 mounted in opposed relation on either side of cylinder housing support 26a better seen in plan view in FIG. 19. Compression springs 206 at their opposed ends, are mounted within the U shaped aperture in base plate 208. Thus, as base plate 208 pivots about pivot point 210 in a generally horizontal plane relative to mainframe 16, gripping tongs 204 may self center about tree trunk 34 as gripping tongs 204 are closed about tree 34.

Figure 18:
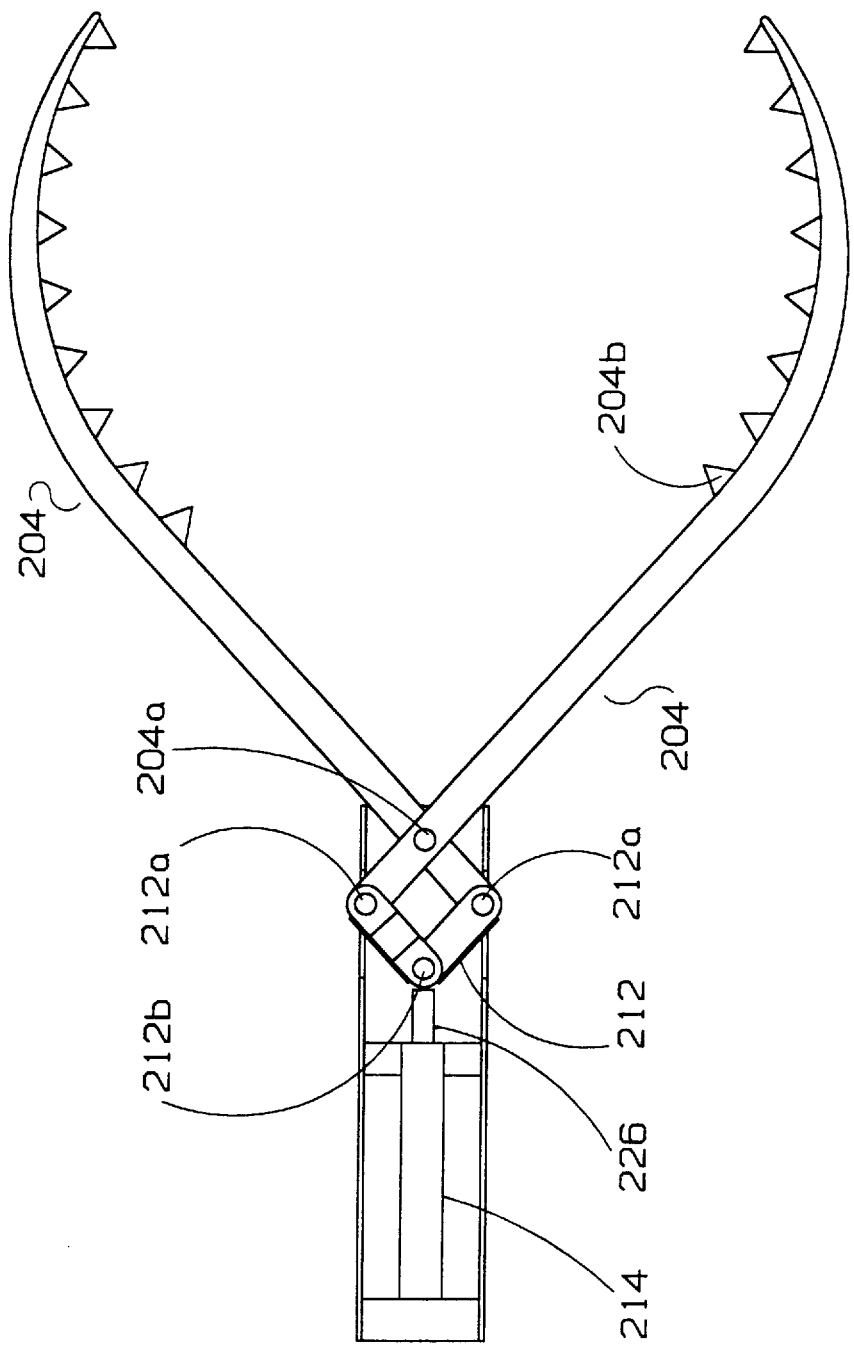
FIG. 18 is an isolated cross-sectional view of the timber pincers and corresponding actuator and actuating linkage of the timber pincers of FIG. 17.
Figure 20:
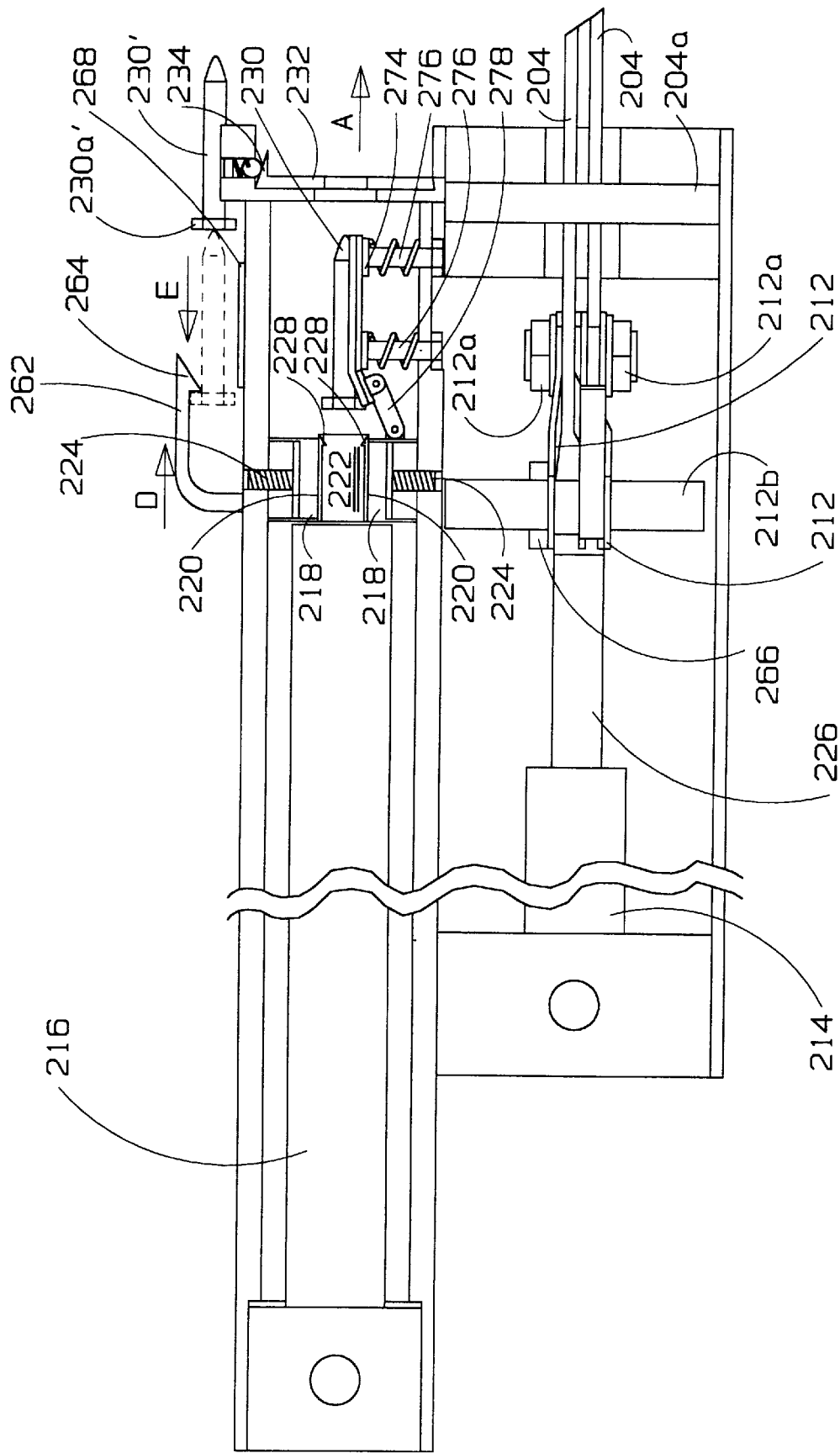
FIG. 20 is a partially cut-away cross-sectional elevation view in view direction V.8 in FIG. 1a of the dogging mechanism of FIG. 19.

The opening and closing of gripping tongs 204 are controlled through linkage 212 by selectively actuable hydraulic cylinder 214, also seen in FIG. 20 in side elevation view. FIG. 20 is a cross sectional view along line 29—29 in FIG. 18. Gripping tongs 204 are illustrated in FIG. 18 in dotted outline in their open position.

Hydraulic cylinder 214 and upper hydraulic cylinder 216 seen in FIG. 20 operate on a single hydraulic circuit The actuation of hydraulic cylinder 216 is inhibited by friction brake linings 218 bearing against sleeve 220 in which is journalled ram 222. Brake linings 218 may be adjusted by means of adjustment screws 224 so as to selectively increase or decrease the pressure, and thereby the friction, applied to the outer surface of sleeve 220.

The friction applied to the outer surface of sleeve 220 by brake linings 218 resist the extension of ram 220 from hydraulic cylinder 216 during the extension of ram 226 from hydraulic cylinder 214. The extension of ram 226 from hydraulic cylinder 214 operates the grappling action of gripping tongs 204. Linkage 212 pivot on pins 212a and 212b. Gripping tongs 204 pivot relative to each other about pin 204a.

When ram 226 has been retracted into hydraulic cylinder 214 so as to grapple gripping tongs 204 about tree trunk 34 so that tree trunk 34 is firmly held within gripping tongs 204, and in particular, by teeth 204b, ram 226 is then at the full extent of its travel and the hydraulic pressure in the hydraulic circuit builds until the pressure exerted on ran 222 exceeds the friction on the outer spice of sleeve 220 by brake linings 218 The result is that ram 222 and sleeve 220 are actuated so as to extend out of hydraulic cylinder 216 to thereby engage the lag bolt 230. Centering ring 228 engages the head of lag bolt 230 and drives lag bolt 230 in direction A through a corresponding aperture in a dog plate 232 seen in FIGS. 21 and 24. The head of lag bolt 230 is sized so as to engage the circumference of the rim around the corresponding aperture in dog plate 232. Thus, as lag bolt 230 is driven by ram 222 in direction A, dog plate 232 is engaged by lag bolt 230 and also driven in direction A.

Figure 19:
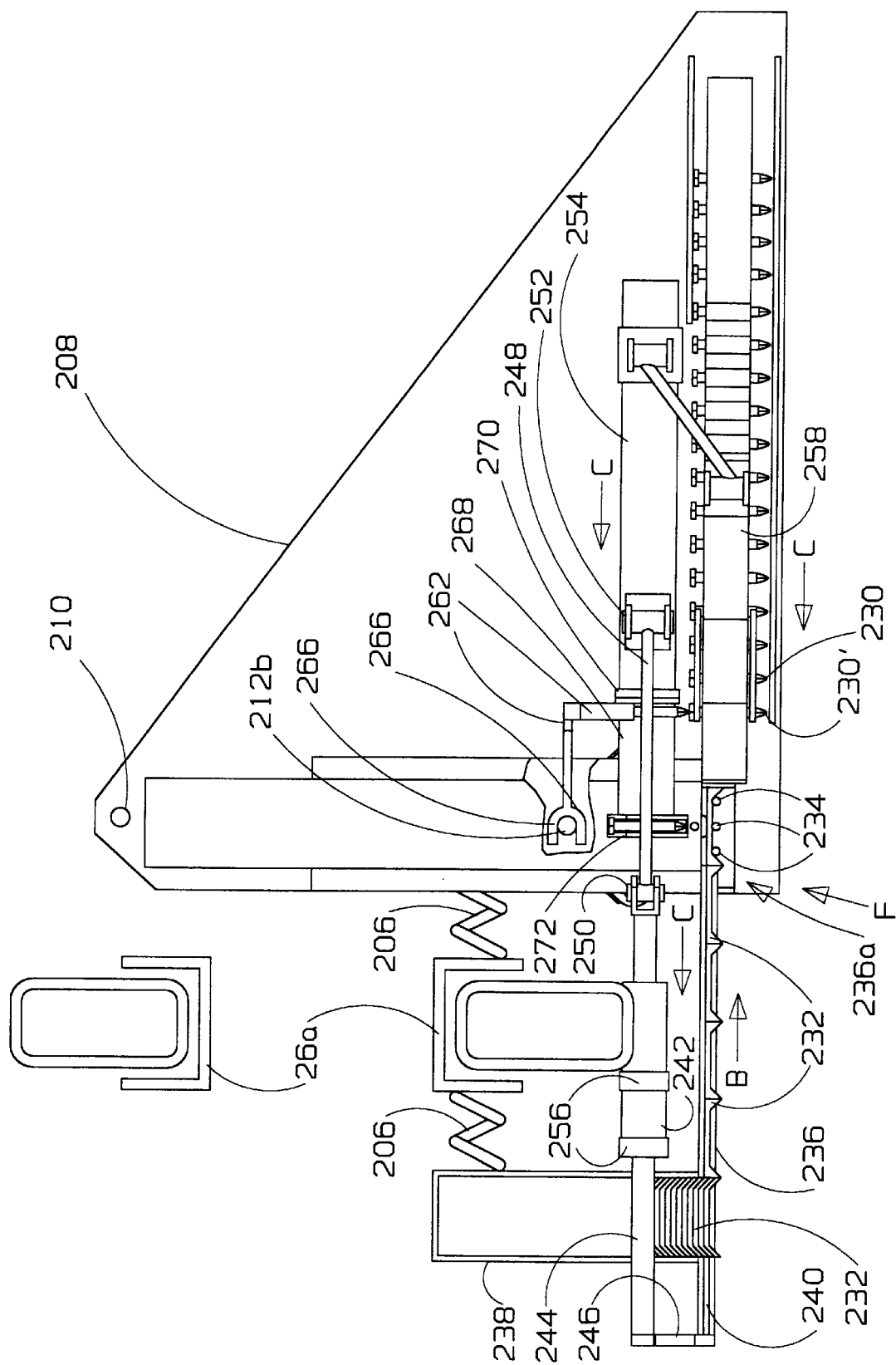
FIG. 19 is, in partially cut-away plan view, the dogging mechanism of the underwater log device of the present invention.

Dog plate 232 is held, releasably, by spring biased ball bearings within the end 236a of dog plate channel 236 seen in FIG. 19.

Figure 21:
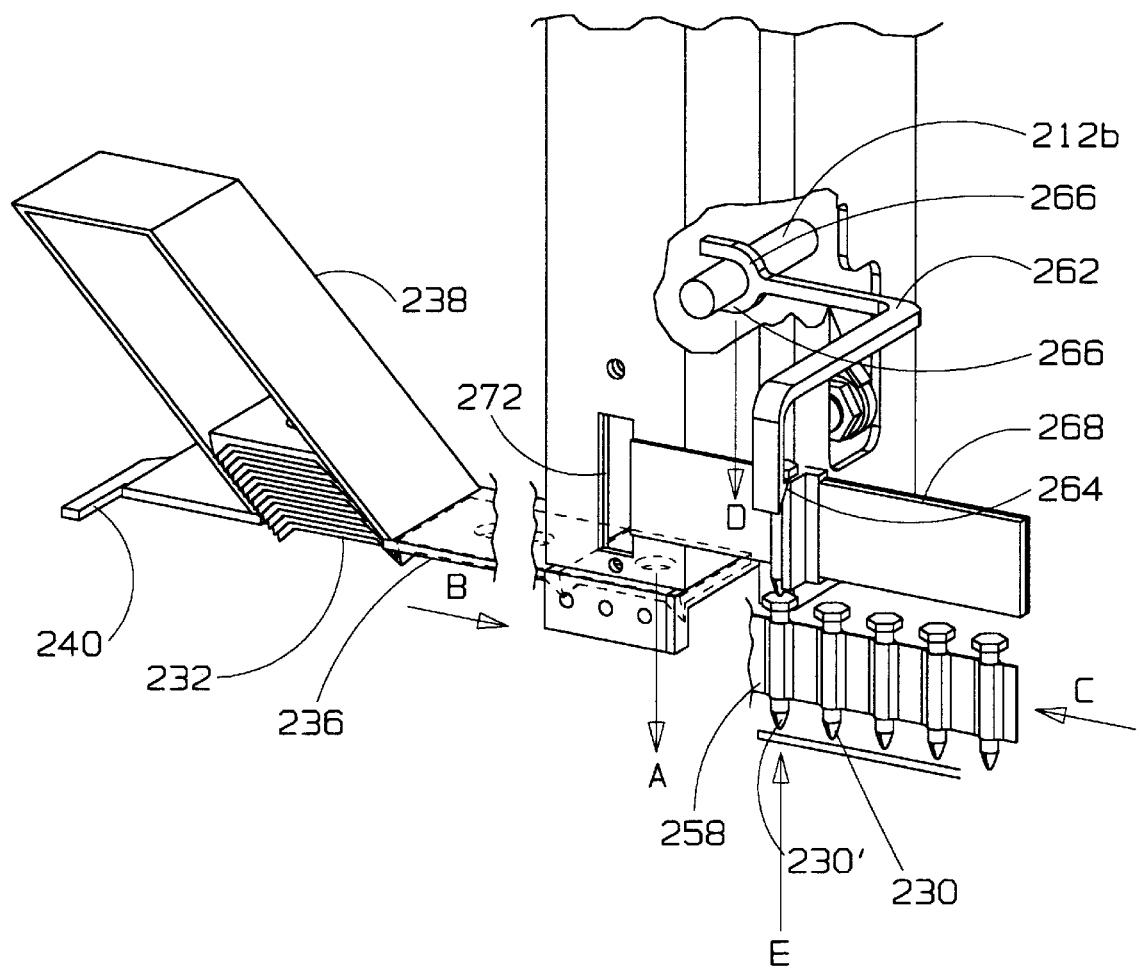
Figure 21A:
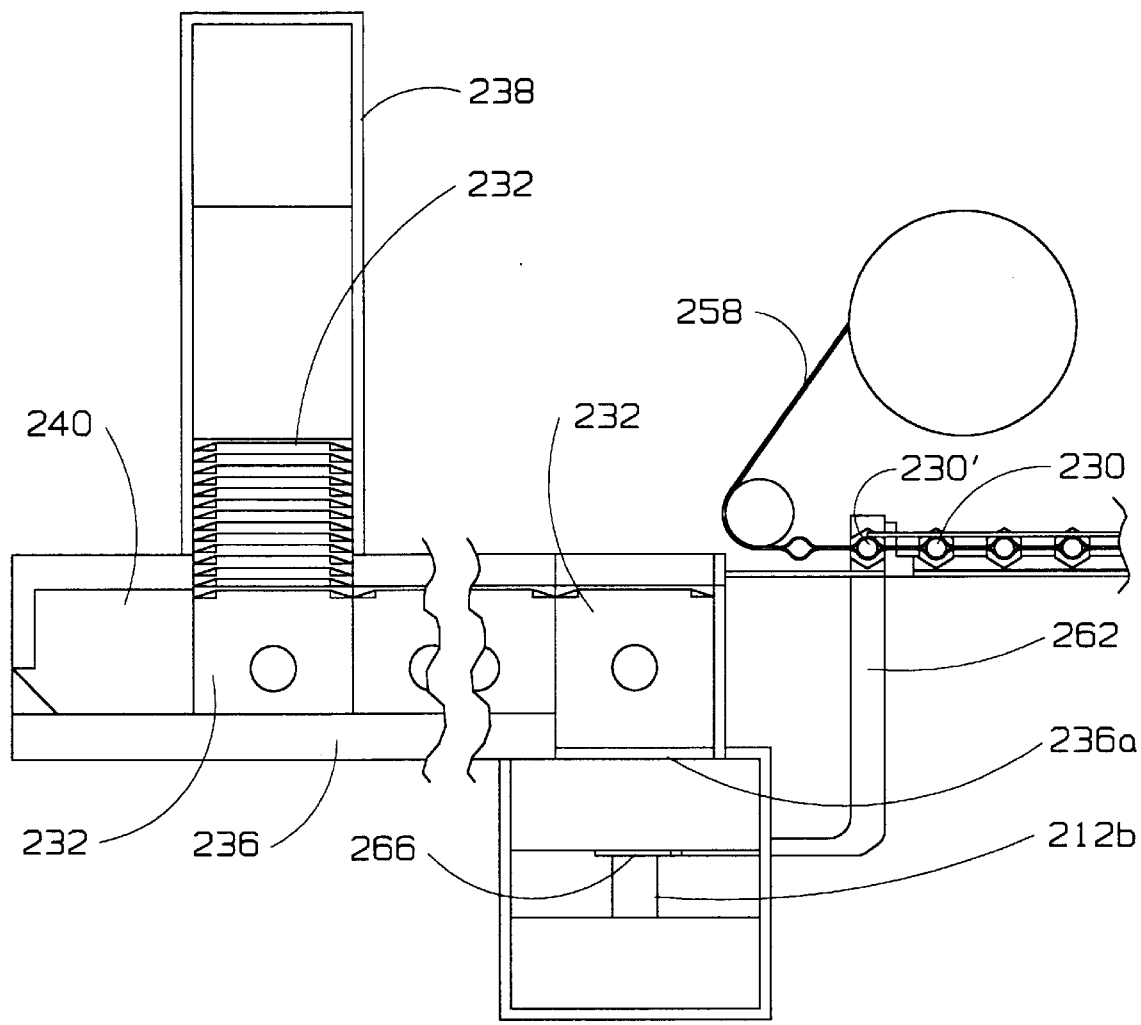

As seen in FIGS. 21 and 21a, dog plates 232 are slid sequentially from feeding within m e 238 along dog plate channel 236. Magazine 238 may be angled backwardly at 45 degrees. Dog plates 232 are slid sequentially in direction B by slider 240. Movement of slider 240 in direction B, and in a direction opposite to direction B, is controlled by selectively actuable hydraulic cylinder 242 selectively extending or retracting ram 244 and cross member 246 as seen in FIG. 19. Dog plates 232 are sequentially slid along dog plate channel 236 so as to selectively index dog plates 232 into dog plate channel end 236a, so as to rest a dog plate 232 on spring biased ball bearings 234.

Figure 22:
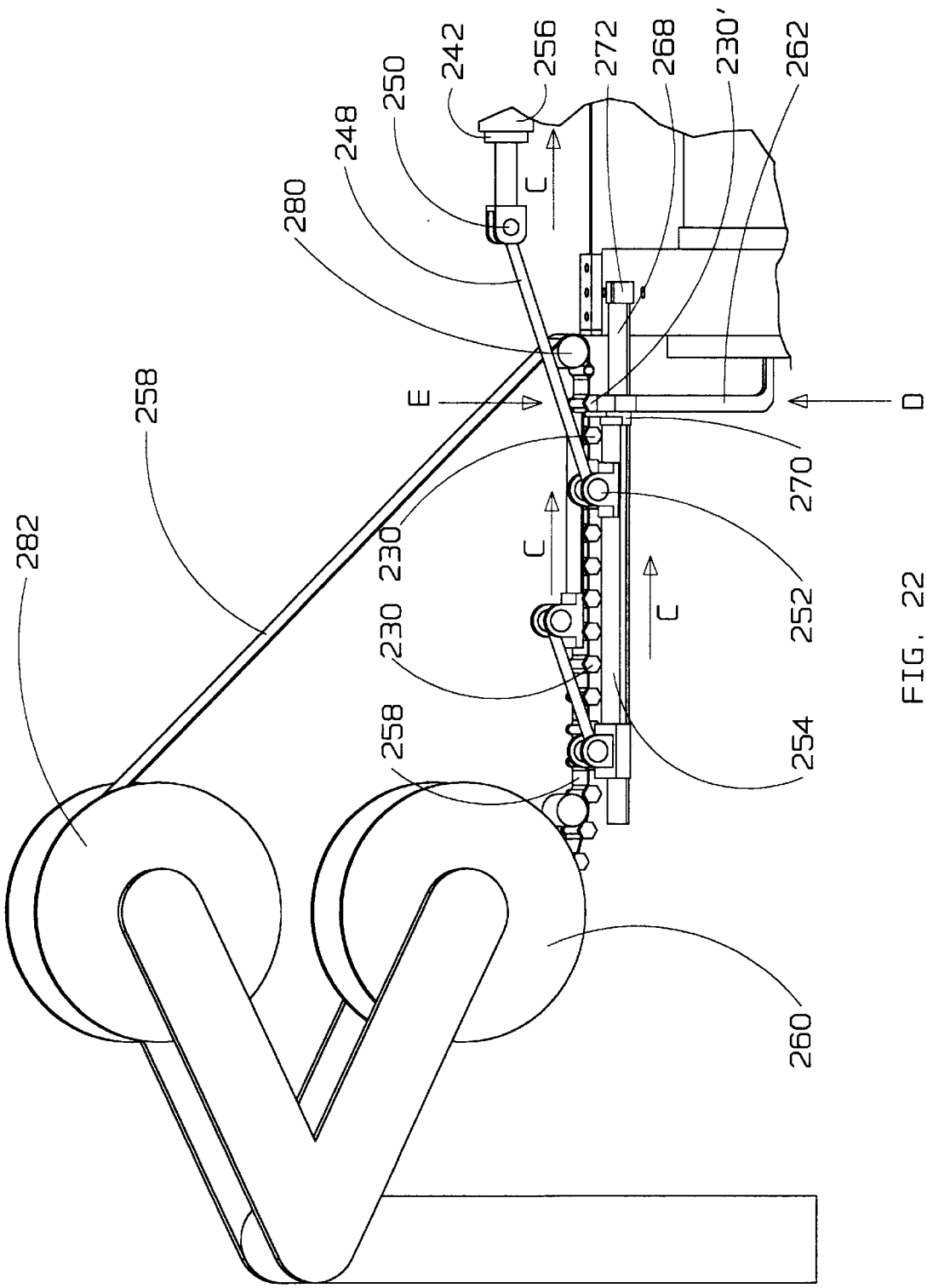
FIG. 22 is, in left side elevation view, the dogging mechanism of FIG. 19 partially cut-away.

As slider 240 is retracted in a direction opposite to direction B by the extension of ram 244 from hydraulic cylinder 242, connecting rod 248, better seen in FIG. 22 pivotally mounted at the base of hydraulic cylinder 242 by pin 250, and pivotally mounted at its opposed end to slide plate 254 by means of pin 252, slides slide plate 254. Because slider 254 is bottomed out by the sliding of dog plates 232 along channel 236, the movement of ram 244 is limited at that point and in consequence cylinder 242 then slides relative to ram 244 in a direction opposite to direction B, namely, direction C within collars 256.

Movement of cylinder 242 in direction C, because of connecting rod 248, moves slide plate 254 also in direction C. The function of slide plate 254 is to sequentially index lag bolts 230 on conveyor belt 258 also in direction C so as to feed lag bolts 230 from storage in magazine 260 so as to position a next available lag bolt 230 for retrieval by retrieval arm 262. For sake of clarity, the lag bolt 230 in the retrievable position is labelled 230'.

Lag bolt retrieval arm 262 has barbed flange 264 for engaging the head of lag bolt 230' when retrieval arm 262 is moved into the lag bolt engaging position illustrated in FIG. 22.

Retrieval arm 262 is moved into the lag bolt retrieving position by means of actuation of ram 226 from hydraulic cylinder 214. Retrieval arm 262 is mounted by means of forks 266 to the uppermost end of pin 212b so that as tongs 204 are opened by the extension of ram 226, retrieval arm 262 is slid forwardly in direction D so as to engage barbed flange 264 with lag bolt head 230a'. Consequently, as gripping tongs 204 are closed onto tree trunk 34 by the retraction of ram 226 into hydraulic cylinder 214, retrieval arm 262 is slid by means of its linkage to pin 212b so as to drag lag bolt 230' in direction E into the position shown in dotted outline in FIG. 20. In that position, lag bolt 230' mm on ramp 268 so that as slide plate 254 is translated in direction C, pusher member 270 on the leading edge of slide plate 254 engages lag bolt 230' forcing it also in direction C so as to drop from ramp 268 into slot 272.

From slot 272 the lag bolt falls onto cradle 274. Cradle 274 is float mounted on sprigs 276 and linked by means of pivotal linkage 278 so as to support vertical floating motion of cradle 274.

Conveyor 258, as described above, moves in direction C as lag bolts 230 are indexed into their retrieval position. Once lag bolts 230 have been removed from conveyor 258, conveyor 258 is rotated around idler wheel 280 and taken up on spring biased spool 282.

Figure 23:
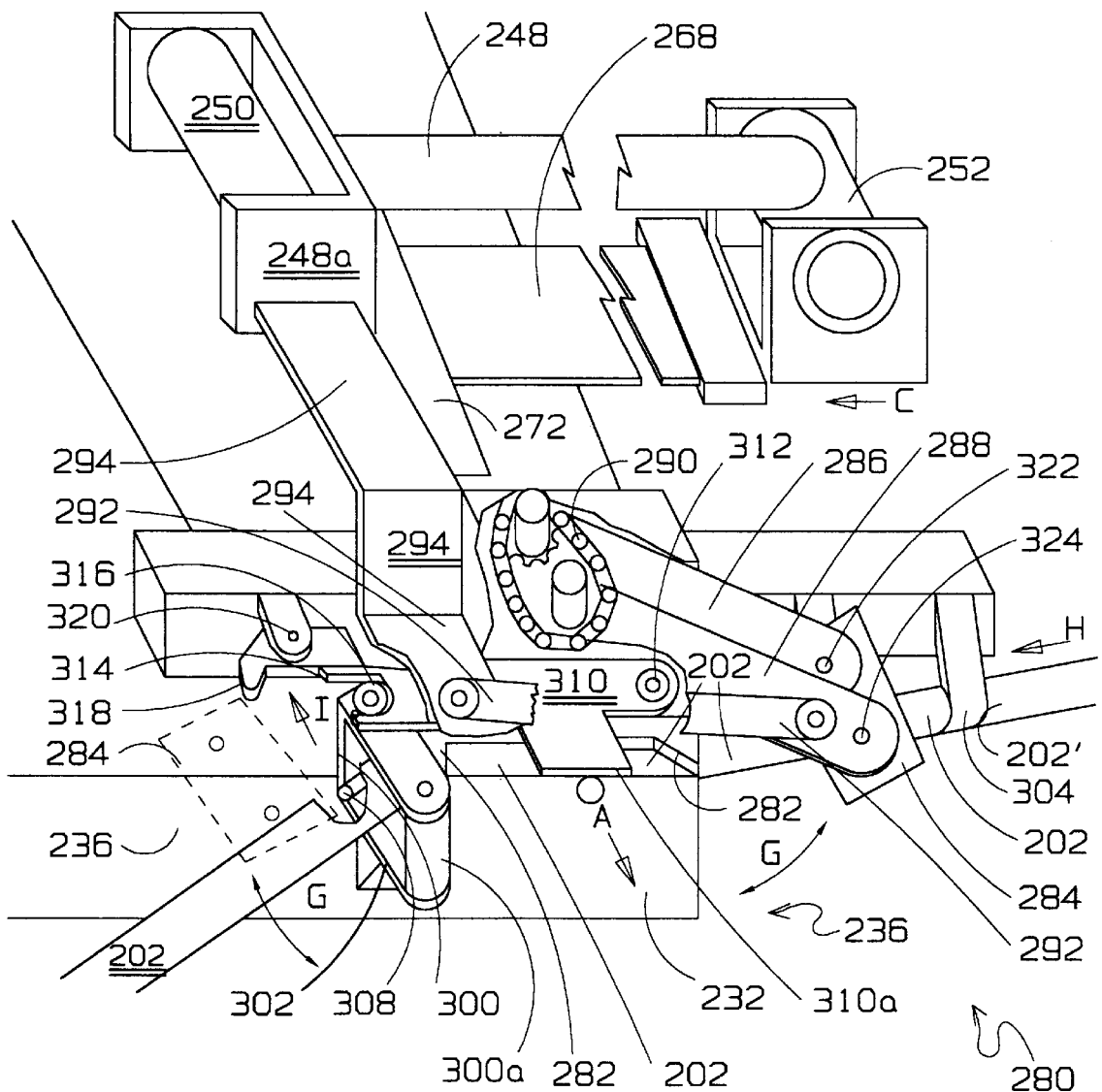
FIG. 23 is, in partly cut-away enlarged perspective view, the dogging mechanism of FIG. 22 in right side perspective view.

FIG. 23 is a view such as would be seen in direction F illustrated in FIG. 19. In FIG. 19, however, the dog line control unit 280 is not illustrated for sake of clarity. The object of dog line control unit 280 is to control the placement of dog line 202 so that the dog line is placed against dog plate 232 underneath dog plate prongs 282. With dog line 202 so placed, when dog plate 232 is driven against the surface of a tree trunk 34, dog line 202 is trapped against tree trunk 34 between dog plate 232 and the trunk surface assisted by dog plate prongs 282.

Figure 24:
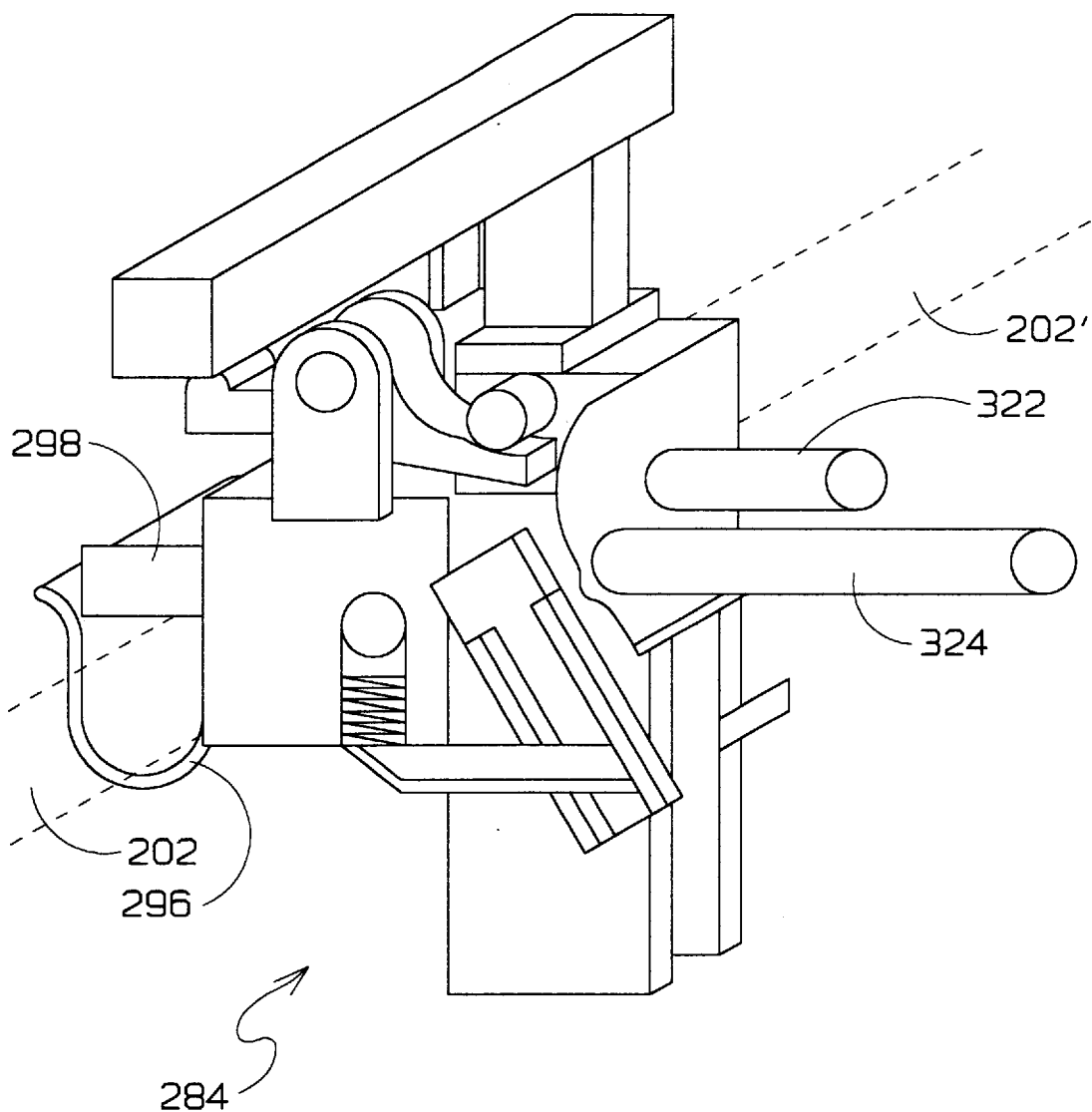
FIG. 24 is, in partially cut-away enlarged view, the rope shuttle of the dogging mechanism of FIG. 23.
Figure 26:
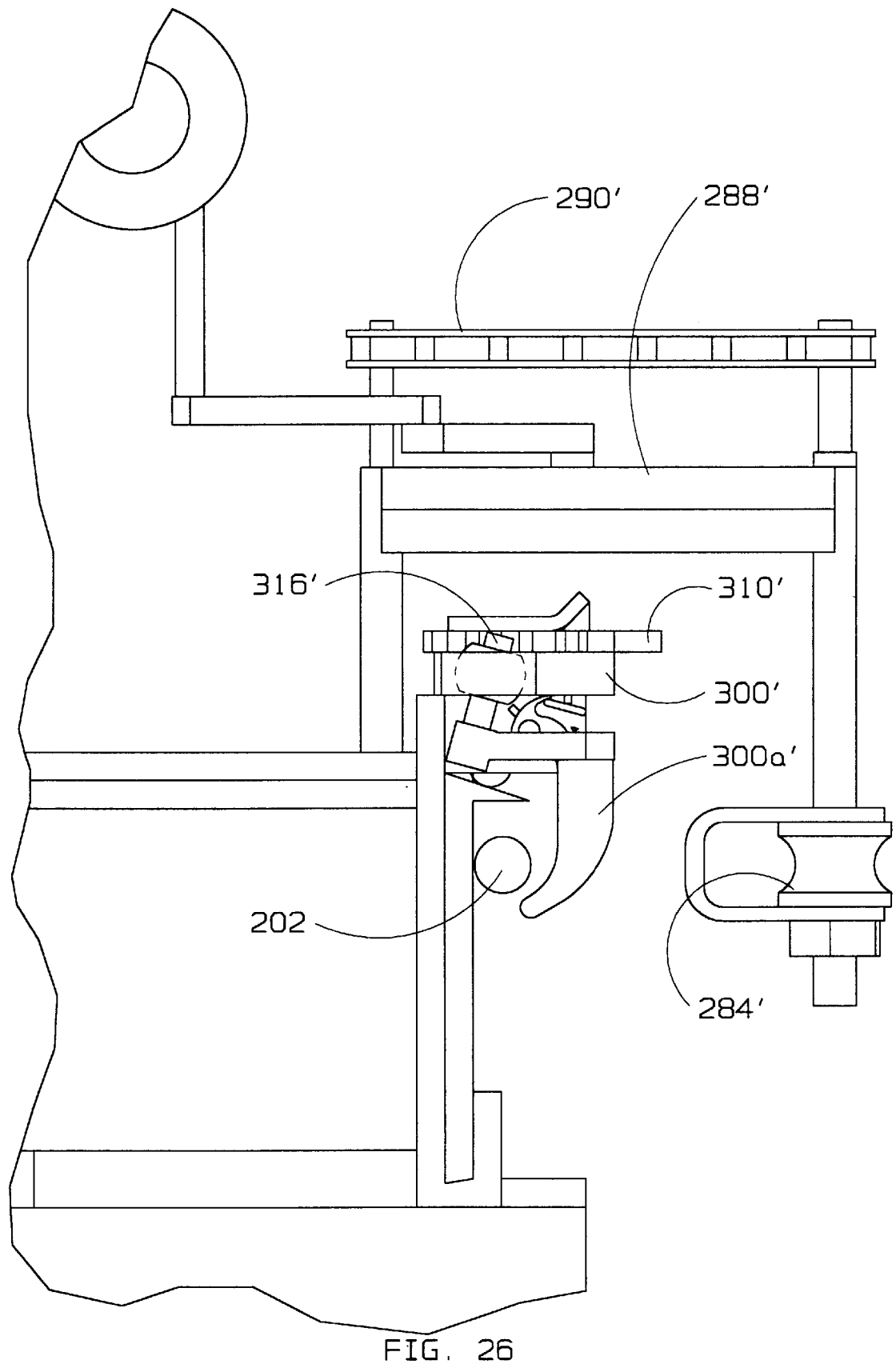

The operation of dog line control unit 290 is best viewed in conjunction with FIG. 24, which is, in perspective view, rope shuttle 284 in an enlarged view. Shuttle 284 grasps dog line 202 and rotates by means of parallel arms 286 and 288 respectively pivotally mounted on roller chain 290 so as to maintain a constant orientation of rope shuttle 284 as it is rotated in direction G in a generally horizontal planes Rotation in direction G of parallel arms 286 and 288 so as to translate rope shuttle 284 is actuated by connecting rod 292 (shown partially cut away for clarity), pivotally linked through rigid connecting member 294, to the end 248a of connecting rod 248.

Thus as slide plate 254 is moved in direction C by the operation of connecting rod 248 and hydraulic cylinder 242, the rigid linkage through rigid connecting member 294 and connecting rod 292 results in corresponding rotational translation in direction G of rope shuttle 284.

Rope shuttle 284 translates from the dog line engaging position illustrated in FIG. 23, whereat dog line 202' is held in channel 296 by deadbolt 298, so that dog line 202 may be placed in a controlled fashion into the opening between rotatable frame member 300 and rigid frame member 302, and thereby so as to tension dog line 202 from feed collar 304 in which dog line 202 is journalled, across the face of dog plate 232. Dog line 202', which is the upstream feed length of dog line 202, feeds through feed collar 304 from dog line feed spool 306 so as to feed dog line in direction H.

Rotatable frame member 300 is rotatable relative to rigid frame member 302 about pin 308. When tree trunk 34 is engaged, tree engaging member 310, and in particular tree engaging flange 310a engages the outer most surface of tree trunk 34, whereupon tree engaging member 310 is rotated backwards about pivot pin 312. Rotation backwards of tree engaging member 310 about pivot pin 312 translates forks 314 in direction I thereby carrying follower 316 also in direction I. Follower 316 is mounted as on a ball joint to rotatable frame member 300, so that as follower 316 is translated in direction I, rotatable flame member 300 pivots upwardly about pin 308 thereby raising rotatable frame member 300a to thereby release rope 202 held between rotatable frame member 300 and rigid frame member 302.

Once clear of tree trunk 34, rope shuttle 284 is actuated to shuttle dog line 202 into position between rotatable frame member 300 and rigid frame member 302 so as to place rope shuttle 284 into the position shown in dotted outline in FIG. 23. Once in that position, rope shuttle 284 engages rocker arm 318, which then pivots about pin 320 to thereby throw forks 314 and follower 316 forward in a direction reverse to direction I, thereby closing rotatable frame member 300 down onto rigid frame member 302. Dog line 202 which bad been shuttled by rope shuttle 284 is thereby captured between rotatable frame member 300 and rigid frame member 302. Rope shuttle 284 is then returned by translation in direction G to its originating position to once again recapture dog line 202 within channel 296, deadbolt 298 being then actuated to close off channel 296 to retain dog line 202 therein.

The position of deadbolt 298 controls whether dog line 202 is held within channel 296 or released therefrom. Parallel arms 286 and 288 are pivotally mounted to rope shuttle 284 by means of shafts 322 and 324 respectively. Rope shuttle 284 maintains a constant orientation relative to base plate 208 by means of there being mounted to chains 290.

An alternative embodiment, somewhat simplified in structure is illustrated in FIGS. 25, 25a, 25b and 26 where corresponding parts are labelled with corresponding part numbers, designated with a "prime" ("'"). Thus, for example, rope shuttle 284 in FIG. 23, is simplified rope shuttle 284' in FIGS. 34 and 34b.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An underwater logging device for selectively maneuvering to, and selectively sawing and dogging, submerged free standing timber, comprising:

buoyancy means mounted on a frame selectively remotely actuable steering means mounted to said frame, independently steerable motivating traction means, rotatably mounted to said frame and cooperating with, so as to be steerable by, said steering means for translating said underwater logging device over a lakebed and between said free standing timber, remotely monitorable vision means mounted to said frame, selectively remotely actuable sawing means mounted to said frame so as to be disposable outwardly of said frame for cutting engagement with said free standing timber as said underwater logging device is translated into proximity to said free standing timber by said motivating traction means.

2. The device of claim 1 wherein said buoyancy means is at least one buoyancy tank mounted to said frame.

3. The device of claim 2 wherein said frame is elongate and said buoyancy means are a pair of buoyance tanks mounted on opposite ends of sad frame.

4. The device of claim 1 wherein said steering means are a pair of selectively actuable, coordinated fore and aft actuators mounted on said frame.

5. The device of claim 1 wherein said traction means are fore and aft hydraulically motivated wheels corresponding to, and selectively steerable by, said steering means.

6. The device of claim 1 wherein said vision means is sonar sensing and monitoring means.

7. The device of claim 1 wherein said vision means is video surveillance and monitoring means.

8. The device of claim 1 wherein said sawing means are chainsaws pivotally mounted on a selectively elevatable platform, mounted to, and elevatable relative to, said frame.

9. The device of claim 8 wherein said elevatable platform is selectively tiltable relative to said frame.

10. The device of claim 9 wherein sad chainsaws are pivotally mounted so as to be swung from a recessed position, generally recessed relative to said platform, to an outwardly disposed position generally perpendicular to said frame and lying in a plane generally parallel to said platform, and wherein said chainsaws am selectively actuable by hydraulic actuation means.

11. The device of claim 1 further comprising log dogging means mounted on said frame.

12. The device of claim 11 wherein said log dogging means is mounted to said frame so as to extend laterally outwardly of said frame and comprises means for holding a timber member adjacent said dogging means, means for holding a dogging line between a dogging plate and said timber member adjacent said frame, said dogging plate held in a retention means on said log dogging means for releasably retaining said dogging plate on said log dogging means, securing means for securing said dogging plate to said timber member so as to clamp said dogging line therebetween, releasing means for releasing said dogging line once secured between said dogging plate and said timber member.

13. The device of claim 12 wherein said means for holding a dogging line includes a pivotable arm having a dogging line guide at a distal end thereof for guiding ad dogging line across said dogging plate, and wherein said retention means aligns said dogging plate releasably mounted thereon with said securing means, and said securing means includes driving menu for driving a securing member through a corresponding aperture in said dogging plate into secured engagement with said timber member, and wherein said releasing means is actuated by proximity to, and engagement of, said timber member.

14. The device of claim 13 wherein said securing member is a bolt, and said driving means is a selectively actuable first hydraulic ram.

15. The device of claim 14 wherein said means for holding said timber member adjacent a dogging device are selectively actuable pincers for clamping said timber member between said pincers and actuable by a selectively actuable second hydraulic ram.

16. The device of claim 15 wherein said first and second hydraulic rams are on a single hydraulic circuit and said first hydraulic ram is actuatable so as to be actuated after a delay following actuation of said second hydraulic ram, said delay regulated by frictional braking means applied to said first hydraulic ram whereby hydraulic pressure applied to said single hydraulic circuit actuates said pincers to gasp said timber member before said bolt is driven trough said aperture in said dogging plate and into said timber member to secure said dogging line to said timber member.

* * * * *